(12) United States Patent
Kitamura et al.

(10) Patent No.: US 8,440,014 B2
(45) Date of Patent: May 14, 2013

(54) BRIGHT PIGMENT, AND BRIGHT COATING COMPOSITION AND AUTOMOTIVE BODY COATING EACH CONTAINING THE SAME

(75) Inventors: Takeaki Kitamura, Tokyo (JP); Takashi Wakamiya, Tokyo (JP); Tomohiro Yagyu, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 344 days.

(21) Appl. No.: 12/597,829

(22) PCT Filed: Apr. 28, 2008

(86) PCT No.: PCT/JP2008/058216
§ 371 (c)(1),
(2), (4) Date: Oct. 27, 2009

(87) PCT Pub. No.: WO2008/136471
PCT Pub. Date: Nov. 13, 2008

(65) Prior Publication Data
US 2010/0083872 A1    Apr. 8, 2010

(30) Foreign Application Priority Data

Apr. 27, 2007    (JP) .................................. 2007-120283

(51) Int. Cl.
*C09C 1/00*    (2006.01)
*C04B 14/00*    (2006.01)

(52) U.S. Cl.
USPC ......................................... 106/415; 106/401

(58) Field of Classification Search ................. 106/415, 106/401, 286.1, 456; 424/401
See application file for complete search history.

(56) References Cited

U.S. PATENT DOCUMENTS

| | | | |
|---|---|---|---|
| 3,370,971 A | 2/1968 | Linton |
| 3,483,009 A | 12/1969 | Willis |

(Continued)

FOREIGN PATENT DOCUMENTS

| | | |
|---|---|---|
| DE | 24 29 762 | 1/1976 |
| DE | 41 38 376 | 9/1993 |

(Continued)

OTHER PUBLICATIONS

Kurata et al. "Saishin Funtai Bussei Zusetsu (Physical Properties of Powder Particles with Illustrations, Latest version), Third Edition," NGT Co., Jun. 30, 2004, p. 13, with its partial translation.

(Continued)

*Primary Examiner* — Pegah Parvini
(74) *Attorney, Agent, or Firm* — Hamre, Schumann, Mueller & Larson, P.C.

(57) ABSTRACT

The bright pigment of the present invention includes flaky particles and a metal oxide layer coating at least a part of the surface of each flaky particle. The bright pigment or the flaky particles of the present invention have a particle size distribution in which the particle size at 99% of the cumulative volume from the smaller particle size is 48 μm or less, and the maximum particle size is 62 μm or less. The flaky particles are made of a material having a refractive index in the range of 1.4 to 1.8. The flaky particles have a thickness distribution in which the frequency of the particles having a thickness in the range of 0.8 μm to 1.9 μm is 90% or more by volume, or the frequency of the particles having a thickness in the range of 0.01 μm to 0.35 μm is 90% or more by volume.

12 Claims, 3 Drawing Sheets

U.S. PATENT DOCUMENTS

| | | | |
|---|---|---|---|
| 3,497,374 A | 2/1970 | Nix | |
| 3,545,994 A | 12/1970 | Lott | |
| 3,585,160 A | 6/1971 | Miller et al. | |
| 3,711,433 A | 1/1973 | Willey et al. | |
| 4,084,983 A | 4/1978 | Bernhard et al. | |
| 4,239,548 A | 12/1980 | Barnard et al. | |
| 4,375,373 A | 3/1983 | Abe et al. | |
| 4,544,415 A | 10/1985 | Franz et al. | |
| 5,183,504 A | 2/1993 | Kuwajima et al. | |
| 5,223,034 A | 6/1993 | Nitta et al. | |
| 5,423,912 A | 6/1995 | Sullivan et al. | |
| 5,436,077 A | 7/1995 | Matsuba et al. | |
| 5,472,491 A | 12/1995 | Duschek et al. | |
| 5,668,077 A | 9/1997 | Klopries et al. | |
| 5,734,068 A | 3/1998 | Klopries et al. | |
| 5,753,371 A | 5/1998 | Sullivan et al. | |
| 5,759,255 A | 6/1998 | Venturini et al. | |
| 5,874,072 A | 2/1999 | Alwattari et al. | |
| 5,985,258 A | 11/1999 | Alwattari et al. | |
| 6,033,466 A | 3/2000 | Ito | |
| 6,267,810 B1 * | 7/2001 | Pfaff et al. | 106/415 |
| 6,348,533 B1 | 2/2002 | Kishimoto et al. | |
| 6,488,867 B1 | 12/2002 | Matsumoto et al. | |
| 6,491,932 B1 | 12/2002 | Ramin et al. | |
| 6,533,858 B1 | 3/2003 | Cacace et al. | |
| 6,620,868 B1 | 9/2003 | Wilke | |
| 6,630,018 B2 | 10/2003 | Bauer et al. | |
| 6,783,584 B2 | 8/2004 | Takahashi | |
| 6,821,333 B2 * | 11/2004 | Zimmermann et al. | 106/405 |
| 6,929,690 B2 | 8/2005 | Vogt et al. | |
| 7,413,599 B2 | 8/2008 | Henglein et al. | |
| 8,088,211 B2 | 1/2012 | Hashizume et al. | |
| 2002/0031534 A1 | 3/2002 | Horino | |
| 2002/0064664 A1 | 5/2002 | Kishimoto et al. | |
| 2002/0096087 A1 | 7/2002 | Glausch | |
| 2003/0105201 A1 | 6/2003 | Auschra et al. | |
| 2003/0129149 A1 | 7/2003 | Pike et al. | |
| 2003/0166755 A1 | 9/2003 | Muhlebach et al. | |
| 2004/0134385 A1 | 7/2004 | Anselmann et al. | |
| 2004/0143032 A1 | 7/2004 | Auschra et al. | |
| 2004/0191198 A1 | 9/2004 | Hochstein et al. | |
| 2005/0004317 A1 | 1/2005 | Auschra et al. | |
| 2005/0014865 A1 | 1/2005 | Bagala et al. | |
| 2005/0257716 A1 | 11/2005 | Mazzella et al. | |
| 2006/0155007 A1 * | 7/2006 | Huber | 523/205 |
| 2006/0159634 A1 | 7/2006 | Heinrichs | |
| 2006/0159635 A1 | 7/2006 | Meyer et al. | |
| 2006/0223910 A1 * | 10/2006 | Bagala | 523/200 |
| 2007/0015012 A1 | 1/2007 | Bujard et al. | |
| 2007/0032573 A1 | 2/2007 | Yanagase et al. | |
| 2007/0212487 A1 | 9/2007 | Anselmann et al. | |
| 2007/0299196 A1 | 12/2007 | Ohkoshi et al. | |
| 2008/0306021 A1 | 12/2008 | Buerger et al. | |
| 2010/0047300 A1 * | 2/2010 | Kaupp et al. | 424/401 |
| 2010/0129412 A1 | 5/2010 | Kitamura | |
| 2010/0137488 A1 | 6/2010 | Kitamura et al. | |
| 2010/0227181 A1 | 9/2010 | Kitamura | |
| 2010/0249304 A1 | 9/2010 | Kitamura et al. | |

FOREIGN PATENT DOCUMENTS

| | | |
|---|---|---|
| DE | 19739124 | 6/1998 |
| EP | 0191292 | 8/1986 |
| EP | 0 342 533 | 5/1989 |
| EP | 0 649 886 | 4/1995 |
| EP | 0 882 673 | 12/1998 |
| EP | 1 469 042 | 10/2004 |
| EP | 1 671 956 | 6/2006 |
| JP | 46-009555 | 3/1971 |
| JP | 48-032415 | 10/1973 |
| JP | 55-018469 | 5/1980 |
| JP | 60-092359 | 5/1985 |
| JP | 61-161212 | 7/1986 |
| JP | 1-138270 | 5/1989 |
| JP | 1-292067 | 11/1989 |
| JP | 1-313575 | 12/1989 |
| JP | 3-054126 | 3/1991 |
| JP | 3-066764 | 3/1991 |
| JP | 4-025582 | 1/1992 |
| JP | 4-193725 | 7/1992 |
| JP | 6-319996 | 11/1994 |
| JP | 7-018199 | 1/1995 |
| JP | 7-268241 | 10/1995 |
| JP | 08-199098 | 8/1996 |
| JP | 10-81837 | 3/1998 |
| JP | 10-114867 | 5/1998 |
| JP | 10-158572 | 6/1998 |
| JP | 10-508599 | 8/1998 |
| JP | 10-259317 | 9/1998 |
| JP | 10-292152 | 11/1998 |
| JP | 11-012426 | 1/1999 |
| JP | 11-130975 | 5/1999 |
| JP | 2000-505833 | 5/2000 |
| JP | 2000-169122 | 6/2000 |
| JP | 2001-031421 | 2/2001 |
| JP | 2001-072933 | 3/2001 |
| JP | 2001-089324 | 4/2001 |
| JP | 2001-226601 | 8/2001 |
| JP | 2001-234090 | 8/2001 |
| JP | 2002-20218 | 1/2002 |
| JP | 2002-509561 | 3/2002 |
| JP | 2002-114934 | 4/2002 |
| JP | 2002-155240 | 5/2002 |
| JP | 2002-194247 | 7/2002 |
| JP | 2002-200844 | 7/2002 |
| JP | 2003-012461 | 1/2003 |
| JP | 2003-213156 | 7/2003 |
| JP | 2004-512394 | 4/2004 |
| JP | 2004-262794 | 9/2004 |
| JP | 2004-275972 | 10/2004 |
| JP | 2004-533510 | 11/2004 |
| JP | 2005-187782 | 7/2005 |
| JP | 2006-176742 | 7/2006 |
| JP | 2006-192384 | 7/2006 |
| JP | 2006-241012 | 9/2006 |
| JP | 2006-257176 | 9/2006 |
| JP | 2006-282572 | 10/2006 |
| JP | 2006-328182 | 12/2006 |
| JP | 2007-051110 | 3/2007 |
| JP | 2007-063127 | 3/2007 |
| JP | 2007-077297 | 3/2007 |
| JP | 2007-138053 | 6/2007 |
| JP | 2007-217319 | 8/2007 |
| JP | 2007-217495 | 8/2007 |
| WO | 96/14278 | 5/1996 |
| WO | 99/62646 | 12/1999 |
| WO | 02/31058 | 4/2002 |
| WO | 02/090448 | 11/2002 |
| WO | 03/006558 | 1/2003 |
| WO | 2007/054379 | 5/2007 |

OTHER PUBLICATIONS

Sun, et al., "Preparation and Characterization of the Mica Titanium Optical Interferential Pigment Coated by $Nd_2O_3$", Bulletin of the Chinese Ceramic Society, vol. 25, No. 6, Dec. 2006 — 5 pages.

* cited by examiner

BRIGHT PIGMENT, AND BRIGHT COATING COMPOSITION AND AUTOMOTIVE BODY COATING EACH CONTAINING THE SAME

TECHNICAL FIELD

The present invention relates to a bright pigment, and a bright coating composition and an automotive body coating each containing the bright pigment.

BACKGROUND ART

As bright pigments such as pearlescent pigments, there have been conventionally known mica flakes, synthetic mica flakes, silica flakes, alumina flakes, glass flakes, graphite flakes, and iron oxide particles composed mainly of alpha-iron oxide crystals, which are coated with metal oxides such as titanium dioxide and iron oxide, and the like. Since such a pearlescent pigment reflects incident light from the outside upon its surfaces and shines brilliantly, it gives a distinctive appearance that has an excellent decorative effect and is rich in variety, when contained in a paint, to the coated surface, or when contained in an ink, to the line or the printed surface, or when contained in a resin composition, to the surface of the resin molding, in synergy with the color tones of the substrates.

For the purpose of improving the decorative effect, the pearlescent pigments are widely used for various use such as automotives, motorcycles, OA equipments, cellular phones, home appliances, various printing matters and writing instruments.

A bright coating composition is reported in which the particle size of a bright pigment is adjusted so as to obtain brightness and prevent a filter from clogging during circulation for coating (see e.g. JP 2002-155240 A).

However, the conventional flaky particles to be applied to the bright pigments for use in an automotive body coating composed of a metallic base layer are made of a material having a refractive index of 1.4 to 1.8, and have an average thickness in the range of 0.3 to 0.7 μm. In the case that the flaky particles have a refractive index and average thickness in such a range, if each particle has a different thickness, the color development of interference light is different in each particle. For this reason, the automotive body coatings to be obtained using these conventional bright pigments have an appearance of a mixture of various colors being present in particles, and thus suffer from lack of color uniformity and color clarity, resulting in a poor design.

Further, as flaky particles to be used for the bright pigments for applications, such as cosmetics, ink, and plastic paints for home appliances, other than the automotive body coating composed of a metallic base layer, there are flaky particles (glass flakes and mica) that are made of a material having a refractive index of 1.4 to 1.8, and that have an average thickness of 0.8 μm or more. However, if the thickness increases, a lot of coarse particles each having a particle size over 62 μm are included therein. Therefore, when using such a bright pigment for the automotive body coating composed of a metallic base layer, it is far from practical use because of the circulation property in which clogging of a filter occurs in application of the coating composition containing the bright pigment to the filter, and the coating finish in which proper orientation of the pigment in the coating film of the coating composition is prevented, thereby causing a part of the pigment to protrude or causing recognition that an excessively large pigment is a foreign object.

Even if adjusting the particle size as proposed in JP 2002-155240 A, it is difficult to achieve a bright pigment that can solve these problems completely, that is, to achieve a bright pigment having favorable properties in a balanced manner, in which an automotive body coating composed of a metallic base layer can be achieved having no mixture of various colors appearing in the particles, while a favorable circulation property and coating finish still are ensured.

DISCLOSURE OF THE INVENTION

It is an object of the present invention to provide a bright pigment, and an automotive body coating composed of a bright coating composition and a metallic base layer in which no mixture of various colors appears in particles due to the difference in the thickness of each flaky particle and, favorable properties such as circulation property and coating finish can be obtained in a balanced manner.

The bright pigment of the present invention includes flaky particles, and a metal oxide layer coating at least a part of the surface of the bright pigment or each flaky particle. The flaky particles have a particle size distribution in which the particle size at 99% of the cumulative volume from the smaller particle size is 48 μm or less, and the maximum particle size is 62 μm or less. The flaky particles are made of a material having a refractive index of 1.4 to 1.8. Further, the flaky particles have a thickness distribution in which the frequency of the particles having a thickness in the range of 0.8 μm to 1.9 μm is 90% or more by volume, or the frequency of the particles having a thickness in the range of 0.01 μm to 0.35 μm is 90% or more by volume.

The present invention further provides a bright coating composition containing the above-described bright pigment of the present invention.

Furthermore, the present invention provides an automotive body coating composed of a metallic base layer containing 0.01 to 30 mass % of the above-described bright pigment of the present invention.

It should be noted that the particle size of flaky particles herein means a light scattering equivalent diameter obtained by measuring the flaky particle using a laser diffraction/scattering method. According to "Saishin Funtai Bussei Zusetsu (Physical Properties of Powder Particles with Illustrations, Latest Version), Third edition" (issued by Yutaka KURATA, published by NGT Co., Jun. 30, 2004), for example, a light scattering equivalent diameter is defined as a diameter of a sphere that has a light scattering pattern closest to a light scattering pattern of a particle obtained by the measurement and that has the same refractive index as the particle.

A particle size distribution is an index indicating the size (particle diameter) of particles and the content ratio of particles of each size among the group of particles to be measured. In the present description, the particle size distribution is measured based on a laser diffraction/scattering method. The laser diffraction/scattering method is a method for determining a particle size distribution by employing scattering light when particles are irradiated with light. The amount of particles is measured by volume to determine the particle size distribution in the present description. The maximum particle size is a particle size at 100% of the cumulative volume in the particle size distribution.

A thickness distribution is an index indicating the thickness of particles and the content ratio of particles of each thickness among the group of particles to be measured. In the present description, the length denoted by a two-headed arrow "d" along a flaky particle 31 in FIG. 3 is measured for each flaky particle as its thickness. Specifically, the thickness distribution is determined by sampling a particular number (preferably 100 or more) of flaky particles from the group of particles to be measured, and measuring the thickness d of them with an electronic microscope.

The bright pigment of the present invention allows uniform color development in which no mixture of various colors appears in particles, as well as a favorable circulation property and coating finish to be achieved. The bright coating composition of the present invention uses the bright pigment of the present invention. It therefore allows uniform color development in the coating film, and a favorable circulation property and coating finish to be achieved. Further, the automotive body coating composed of a metallic base layer of the present invention has a favorable circulation property and coating finish, and provides a design in which no mixture of various colors appears in particles and the particles have color uniformity and color clarity.

BEST MODE FOR CARRYING OUT THE INVENTION

As a result of diligent studies, the inventors consider that the following are problems to be solved by the present invention.

(Interference Colors Resulting from the Thickness of Flaky Particles)

Figure 3:
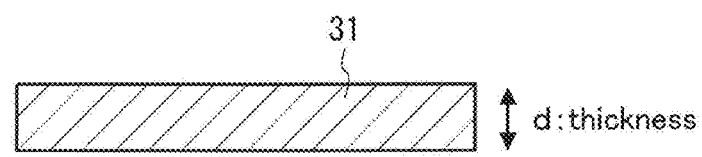
FIG. 3 is a schematic view showing the thickness of the flaky particles.

As described above, it is an object of the present invention to prevent a mixture of various colors from appearing and particles from glowing in a bright pigment. The following describes that the mixture of various colors in particles is caused by the different interference colors due to the difference in the thickness of flaky particles. The thickness of the flaky particles herein means the length denoted by a thickness "d" in FIG. 3. As an example, a bright pigment provided with a metal oxide layer of titanium dioxide and/or iron oxide on the surface of each flaky particle will be described herein.

In the bright pigment of the present example, flaky particles are coated with a metal oxide layer of titanium dioxide and/or iron oxide. Accordingly, in the bright pigment of the present example, color development varies by changing the film thickness of the metal oxide layer that has a high refractive index to cause interference of the reflected light.

On the other hand, the problem to be solved by the present invention is that flaky particles coated by a metal oxide layer and thus present inside the layer develop colors due to interference in the case of having a particular range of thickness, in the same manner as in the metal oxide layer.

In light incident on a thin film layer, the optical path difference between light that is reflected by the incidence interface and light that is reflected by the other interface (the optical path difference between light reflected by the upper face and light reflected by the lower face of the thin film layer) is expressed as follows:

$$2nd \times \cos \gamma \quad \text{(Formula 1)}$$

n: The refractive index of the thin film layer
d: The thickness of the thin film layer (μm)
γ: The refraction angle of the thin film layer In the bright pigment of the present example, titanium dioxide and/or iron oxide to be used for the metal oxide layer has a higher refractive index than each material to be used for the flaky particles. Specifically, the relationship of the refractive index among the layers (metal oxide layer/flaky particles/metal oxide layer) constituting the bright pigment is expressed by the following Formula 2. Further, specific examples for the refractive index $n_1$ of the metal oxide and the refractive index $n_0$ of the flaky particles also are indicated below.

$$n_1(\text{metal oxide layer}) > n_0(\text{flaky particles}) < n_1(\text{metal oxide layer}) \quad \text{(Formula 2)}$$

The refractive index $n_1$ of the metal oxide:
  rutile-type titanium dioxide (2.71)
  anatase-type titanium dioxide (2.52)
  iron oxide (3.01)
The refractive index $n_0$ of the flaky particles:
  C glass (1.54)
  silica (1.46)
  alumina (1.76)
  mica and synthetic mica (1.55 to 1.59)

In the bright pigment of the present example, no phase shift occurs in the light reflected by the first interface between the metal oxide layer ($n_1$) and the flaky particles ($n_0$) of the light-incidence side. Meanwhile, a π (rad) phase shift occurs in the light reflected by the second interface between the flaky particles ($n_0$) and the metal oxide layer ($n_1$) of the other side of light incidence. Accordingly, bright lines in which the reflected light is enhanced by each other are obtained under the condition expressed by Formula 3.

$$2n_0 d \times \cos \gamma = \tfrac{1}{2} \times \lambda \times (2m+1) \quad \text{(Formula 3)}$$

λ: The wavelength of the reflected light (μm)
$n_0$: The refractive index of the flaky particles
d: The thickness of the flaky particles (μm)
m: The interference order (an integer, such as 0, 1, 2, 3 . . . )

The color that the reflected light appears to be due to the difference in the thickness of the flaky particles can be calculated from the Formula 3. When the wavelength λ of visible light is in the range of 380 to 780 nm, and $n_0$ is in the range of 1.4 to 1.8, interference colors such as first-order interference, second-order interference, and third-order interference appear and are mixed in flaky particles having a thickness over 0.35 μm but less than 0.8 μm, and thereby a mixture of various colors appears in the particles so that the particles glow with rainbow colors. In view of above, the inventors found that, by adjusting the thickness distribution of the flaky particles so that the frequency of the flaky particles having a thickness in the range of 0.8 μm to 1.9 μm is 90% or more by volume, or the frequency of the flaky particles having a thickness in the range of 0.01 μm to 0.35 μm is 90% or more by volume, color uniformity and color clarity can be obtained in which no mixture of various colors appears in the particles.

Since such reflected light by the flaky particles is more enhanced in the automotive body coating of deep colors such as N1 to N7 (color values based on the Munsell color system) than in that of light colors, it is particularly preferable that the after-mentioned configuration of the present invention be employed in a coating of deep colors.

(Effects on Coating Finish Caused by Coarse Particles and Difference in the Thickness of Bright Pigment)

There are two main requirements for an automotive body coating (a coat). One of the requirements is providing protection against corrosion of a coated substrate (a steel plate), and the other is having not only an attractive design (with a clear and uniform color) but also an appearance quality with high brightness and smoothness like a mirror.

In order to express the appearance quality, terms such as "glossy", "dull", "DOI: distinctness of image", and "orange peel" are used, for example.

The appearance quality is determined by the difference in light reflection because of uneven patterns on a coated surface, which is perceived by human eyes. As a method for optically measuring the light/dark pattern at a wavelength on a coated surface in the same manner as by human eyes, a micro-wave-scan (manufactured by BYK-Gardner) is known.

In the micro-wave-scan, a point light source of laser irradiates the coated surface with a laser beam inclined at an angle of 60 degree with respect to the perpendicular line to the coated surface of a sample, and then a detector measures the reflected light having the same angle, but in the opposite direction, with respect to the perpendicular line. By moving the point light source of laser on the coated surface of the sample for scan, this device makes it possible to measure the light/dark of the reflected light at a predetermined interval, point by point, so as to detect an optical profile of the coated surface of the sample. The structure of the base, interior, or surface of the coating can be analyzed by carrying out a spectrum analysis of thus detected optical profile using a frequency filter.

Characteristic spectrum of the device is as follows.
du: Wavelength of 0.1 mm or less
Wa: Wavelength of 0.1 to 0.3 mm
Wb: Wavelength of 0.3 to 1 mm
Wc: Wavelength of 1 to 3 mm
Wd: Wavelength of 3 to 10 mm
We: Wavelength of 10 to 30 mm
Sw: Wavelength of 0.3 to 1.2 mm
Lw: Wavelength of 1.2 to 12 mm
DOI: Wavelength of 0.3 mm or less The inventors found that coarse particles and the difference in the thickness of a bright pigment affect the appearance properties of dullness and DOI (distinctness of image) of an automotive body coating composed of a metallic base layer.

Specifically, it turned out that, as the thickness of the bright pigment increased, the intensity of the characteristic spectrum of du (wavelength of 0.1 mm or less), Wa (wavelength of 0.1 to 0.3 mm), Sw (wavelength of 0.3 to 1.2 mm), and DOI (wavelength of 0.3 mm or less) also increased, which resulted in adverse effects on the appearance properties of dullness and distinctness of image.

In addition, if coarse particles increased in the bright pigment, the intensity of the characteristic spectrum of du (wavelength of 0.1 mm or less), Wa (wavelength of 0.1 to 0.3 mm), Sw (wavelength of 0.3 to 1.2 mm), and DOI (wavelength of 0.3 mm or less) also increased, which resulted in adverse effects on the appearance properties of dullness and distinctness of image.

In consideration of the above results, the inventors suggest the bright pigment of the present invention with the following first and second embodiments.

The bright pigment of the first embodiment of the present invention includes flaky particles, and a metal oxide layer coating at least a part of the surface of each flaky particle. The bright pigment or the flaky particles have a particle size distribution in which the particle size at 99% of the cumulative volume from the smaller particle size is 48 μm or less, and the maximum particle size is 62 μm or less. The flaky particles are made of a material having a refractive index of 1.4 to 1.8. Further, the flaky particles have a thickness distribution in which the frequency of the particles having a thickness in the range of 0.8 μm to 1.9 μm is 90% or more by volume.

The bright pigment of the second embodiment of the present invention includes flaky particles, and a metal oxide layer coating at least a part of the surface of the flaky particle. The bright pigment or flaky particles have a particle size distribution in which the particle size at 99% of the cumulative volume from the smaller particle size is 48 μm or less, and the maximum particle size is 62 μm or less. The flaky particles are made of a material having a refractive index of 1.4 to 1.8. Further, the flaky particles have a thickness distribution in which the frequency of the particles having a thickness in the range of 0.01 μm to 0.35 μm is 90% or more by volume, preferably in which the frequency of the particles having a thickness in the range of 0.01 μm to 0.1 μm is 90% or more by volume.

Hereinafter, the embodiments of the bright pigment of the present invention will be described. The bright pigment of the present embodiment include flaky particles with the surface being coated by a metal oxide layer.

(Flaky Particles)

An example of the flaky particles in the present embodiment has a particle size distribution in which the particle size at 99% of the cumulative volume from the smaller particle size is 48 μm or less, and the maximum particle size is 62 μm or less. The particle size of the flaky particles of the present embodiment may be adjusted so that the bright pigment has a particle size distribution in which the particle size at 99% of the cumulative volume from the smaller particle size is 48 μm or less, and the maximum particle size is 62 μm or less. The flaky particles of the present embodiment are made of a material having a refractive index of 1.4 to 1.8. Further, the flaky particles of the present embodiment have a thickness distribution in which the frequency of the particles having a thickness in the range of 0.8 μm to 1.9 μm is 90% or more by volume (the first embodiment), or in which the frequency of the particles having a thickness in the range of 0.01 μm to 0.35 μm (preferably to 0.1 μm) is 90% or more by volume (the second embodiment). In the case of the flaky particles of the first embodiment, the flaky particles each have an aspect ratio (the average particle size/average thickness) of, for example, about 2 to 30. In the case of the flaky particles of the second embodiment, the flaky particles each have an aspect ratio (the average particle size/average thickness) of, for example, about 25 to 2000. It should be noted that the average particle size herein means a particle size at 50% of the cumulative volume from the smaller particle size (1150), and the average thickness can be calculated from a thickness distribution obtained by the afore-mentioned method.

In the present embodiment, the flaky particles may be one selected from group substantially consisting of glass, mica, synthetic mica, silica and alumina having a refractive index of 1.4 to 1.8. Although there is no limitation, glass flakes with high surface smoothness and high transparency are used preferably. It is possible to provide a bright pigment with more beautiful interference color by coating glass flakes with titanium dioxide and/or iron oxide.

The glass flakes to be used for the bright pigment of the above-described first embodiment can be produced by, for example, a blowing method. The blowing method is a technique in which a molten glass body that is continuously taken out from a molten glass batch is extended while being inflated into a hollow shape, so that a thin glass film (for example, having an average thickness of about 0.1 to 50 μm) is obtained. By crushing the glass film obtained by this method, the glass flakes of the present embodiment can be produced.

Figure 1:
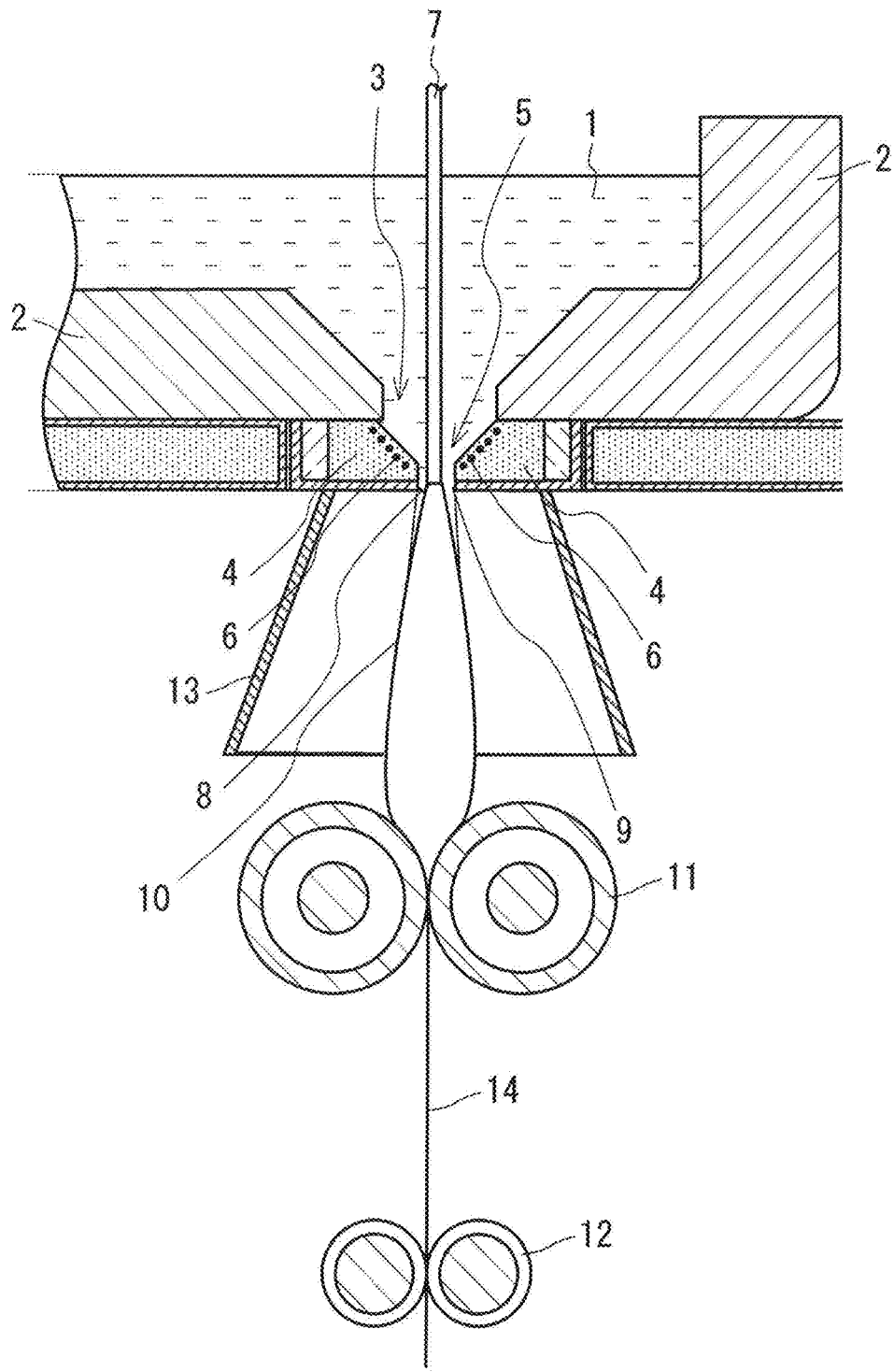
FIG. 1 is a partial cross sectional view schematically showing an example of a device for producing flaky particles to be used for the bright pigment of the present invention.

FIG. 1 is an example of a device for producing a glass film by the blowing method. In FIG. 1, 1 denotes a molten glass body, 2 denotes a fire-resistant furnace bath, 3 denotes a hole provided at the bottom of the furnace bath. 4 denotes a feeder block provided with a circular glass outlet opening 5 that is smaller than the hole 3. The feeder block 4 is made of fire-resistant molding bricks with embedded electric heating wires. The temperature of the molten glass body at the glass outlet opening 5 is kept constant by the electric heating wires 6. 7 denotes a blow nozzle disposed from above the fire-resistant furnace bath 2 to the glass outlet opening 5 through the hole 3. The tip 8 of the blow nozzle 7 forms a circular slit 9 in the glass outlet opening 5. The molten glass body flowing out of the slit 9 is inflated with gas (for example, air) fed through the blow nozzle 7, so as to be a hollow shape. Then, the resultant hollow glass is extended downward so as to form a film having a very thin thickness. 11 denotes a pair of pressure rollers, and 12 denotes a pair of extension rollers. 13 denotes a divergent tubular steel reflecting plate. The hollow glass 10 is not only blocked from outside airflow but also kept hot enough by the reflecting plate 13, so as to be inflated uniformly into a thin film. The hollow glass 10 thus inflated is pressed flat by the pressure rollers 11, and the resultant flat glass film 14 is drawn out. The glass film thus obtained is crushed into particles so as to have a particle size in a predetermined range. Thus, glass flakes are produced.

In the case of producing thin glass flakes as described in the present embodiment using the above-mentioned device, the following methods can be used. For example, a hollow glass is extended at a higher rate, or gas is fed through the blow nozzle with a higher pressure so as to inflate the hollow glass fully.

Figure 2:
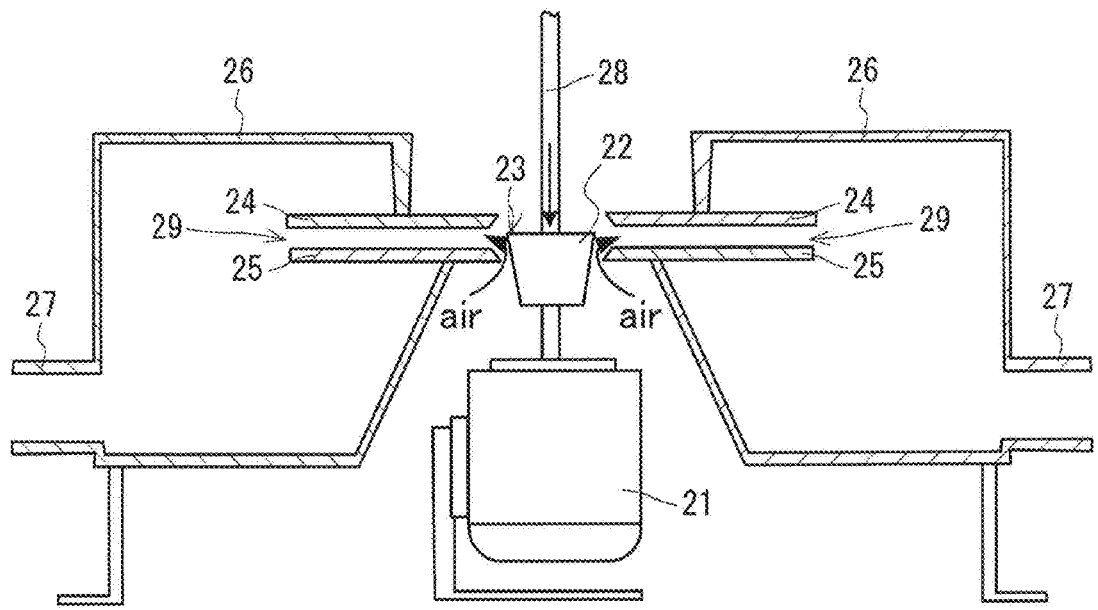
FIG. 2 is a partial cross sectional view schematically showing another example of the device for producing the flaky particles to be used for the bright pigment of the present invention.

The glass flakes of the above-described second embodiment may be produced using the above-mentioned blowing method, however, it also may be produced using a different method. For example, glass flakes may be produced by producing a thin glass film making use of a flow of molten glass caused by centrifugal force, and crushing the thin glass. According to this method, it is possible to produce, for example, glass flakes having an average thickness in the range of 0.01 to 2.0 μm. FIG. 2 is an example of a device for producing glass flakes using the flow of molten glass. This device has a tapered cup 22 mounted to a variable-speed electric motor 21. The rim 23 of the cup 22 is located between two circular plates 24 and 25. Since the upper plate 24 is mounted in such a manner that it can move up and down, the distance between the plates 24 and 25 can be adjusted. The plates 24 and 25 are mounted in a cyclone-type vacuum chamber 26. This chamber 26 is connected, via an outlet connection 27, to a cyclone collection/separation/vacuum pump not shown in this figure. The cup 22 is rotated at a particular speed, and molten glass 28 is poured into the cup 22 from above. The molten glass in the cup 22 is drawn outward by the centrifugal force and spills over the rim 23. The cyclone collection/separation/vacuum pump is activated to reduce the gas pressure inside the chamber 26, thereby feeding air into the chamber 26 through a gap 29 between the plates 24 and 25. The air fed into the chamber 26 rapidly cools the molten glass drawn outward over the rim 23 of the cup 22. Furthermore, the airflow between the plates 24 and 25 also works to keep the molten glass from coming in contact with the surfaces of the plates 24 and 25 when it is drawn out over the rim 23 of the cup 22 and is present between the plates 24 and 25. The airflow between the plates 24 and 25 cools the molten glass present between the plates 24 and 25 until it turns into a solid state. The glass present between the plates 24 and 25 is drawn out in the radial direction by the friction with the airflow, and then crushed into small glass flakes while being kept flat by the airflow. The glass flakes thus obtained are collected in the chamber 26 and delivered to a cyclone collection/filtration section not shown in the figure via the outlet connection 27.

When glass flakes are produced using this device, the thickness of the glass flakes can be adjusted by adjusting the distance between the plates 24 and 25, the speed of the airflow between the plates 24 and 25, and the like.

The surface of thus produced glass flakes maintain the smoothness of the thermally processed surface at the time of melt-molding. A smooth surface reflects light well. Coating materials or resin compositions containing these glass flakes have a high brightness.

(Classification Method)

In the Present Embodiment, the Particle Size of Flaky Particles is Adjusted by, for example, a sieve classification. For example, a dry-type vibrating sieving machine can be used for sieve classification. The mesh size of a sieve to be used may be selected appropriately corresponding to the particle size of the flaky particles before sieving, or the target particle size of the flaky particles.

A classification method other than the sieve classification may be used in order to remove microparticles and coarse particles.

In the case of dry classification, an airflow classifier such as a gravitational classifier, an inertial classifier, and a centrifugal classifier can be used. As a gravitational classifier, horizontal flow-type, vertical flow-type, and inclined flow-type classifiers, for example, can be used. As an inertial classifier, linear-type, curving-type, and louver-type classifiers, and an Elbow-Jet, and a Variable Impactor, for example, can be used. As a centrifugal classifier making use of air vortex, cyclone-type, Vantongeren-type, and classiclone-type classifiers, a Dispersion Separator, and a Microplex can be used. As a centrifugal classifier making use of mechanical rotation, a Micron Separator, a Turboplex, an Acucut, a Turbo Classifier, and the like can be used.

In the case of wet classification, an airflow classifier such as a gravitational classifier and a centrifugal classifier can be used. As a gravitational classifier making use of gravity settling tanks, a settling tank, a deposition cone, a Spitzkasten and a Hydroseparator can be used. As a gravitational classifier making use of mechanical rotation, a drag chain classifier, a rake classifier, a ball classifier, a spiral classifier and the like can be used. As a hydraulic classifier, a "doruko" sizer, a Valenwald sizer, a syphon sizer, a hydroscillator, and the like can be used. As a centrifugal classifier, hydrocyclone and centrifugal classifiers (disk-type and decanter-type) and the like can be used.

(Metal Oxide Layer)

A specific example of the metal oxide layer will be described below.

<Titanium Dioxide Layer>

As an example, there is a titanium dioxide layer to be employed for the metal oxide layer coating the flaky particles. The titanium dioxide layer coating the flaky particles may be substantially composed of rutile-type titanium dioxide. There are three crystal structures of titanium dioxide, which are anatase type, brookite type, and rutile type. Among these, the anatase type and rutile type are industrially manufactured.

The anatase-type titanium dioxide has high photocatalytic activity, and therefore accelerates degradation or discoloration of a resin or paint. On the other hand, the rutile-type titanium dioxide has about one-tenth the photocatalytic activity of the anatase-type titanium dioxide, and therefore can be used suitably for a paint or resin as a pigment. Moreover, the rutile-type titanium dioxide has a higher refractive index than the anatase-type titanium dioxide, and is capable of forming a compact and uniform coating layer easily. As a result, color development by light interference is enhanced. Examples of methods for producing the rutile-type titanium dioxide include a method using precipitation from a solution containing titanium by a neutralization reaction under a temperature of 55 to 85° C., and a pH of 1.3 or less, as disclosed in JP 2001-31421 A. This method requires no heating for crystal structure transformation essentially, and therefore the rutile-type titanium dioxide can be fixed easily to a substrate having a lower heat resistance. The thickness of the rutile-type titanium dioxide layer in the bright pigment of the present embodiment is preferably, for example, 20 nm to 200 nm.

<Iron Oxide Layer>

As another example, there is iron oxide to be employed for the metal oxide layer coating the flaky particles. Iron oxide has a low photocatalytic activity, that is, about one-tenth the photocatalytic activity of the anatase-type titanium dioxide, in the same manner as the rutile-type titanium dioxide, and therefore can be used suitably as a pigment to be contained in a paint or resin. Use of the iron oxide facilitates chromatic development of colors due to absorption of light by the iron oxide as well as development due to interference light. In the bright pigment of the present embodiment, a trivalent iron oxide, or a mixture of a bivalent iron oxide and a trivalent iron oxide may be used as an iron oxide for coating the flaky particles. Examples of methods for producing the iron oxide include a method using precipitation from a solution containing iron by a neutralization reaction under a temperature of 50 to 80° C., and a pH of 2 to 4, as disclosed in JP 2005-187782 A. The thickness of the iron oxide layer is preferably 20 nm to 200 nm.

(Other Coating Layer)

Since outdoor use is assumed for automotives or motorcycles, pigments to be used therein are required to have high weather resistance. Exposure to ultraviolet rays accelerates degradation or discoloration of the coating film, due to the photocatalytic activity of the titanium dioxide and/or iron oxide contained in the pigment. For the purpose of high weather resistance, it is preferable that the bright pigment be over-coated with hydroxide or hydrated oxide of at least one element selected from the group consisting of lanthanum, cerium and aluminum. Further, in order to improve the water resistant secondary adhesion in addition to the above-described weather resistance, it is more preferable that the bright pigment be provided with a surface treatment layer as the outermost layer using an organic compound containing an oxazoline ring and/or a silane coupling agent.

<Hydroxide or Hydrated Oxide of Cerium>

A hydroxide or hydrated oxide of cerium can be precipitated on the particles (the flaky particles coated with titanium dioxide and/or iron oxide) by reacting a water-soluble cerium compound with acid or alkali. Examples of the acidic cerium compound to be used include mineral acid salts such as cerium sulfate, cerium chloride, and cerium nitrate. The hydroxide or hydrated oxide of cerium can be precipitated by reacting the acidic cerium compound with alkali such as an alkali metal hydroxide. Instead of the acidic cerium compound, it is also possible to use alkali cerium salts, such as ammonium cerium sulfate, and ammonium cerium nitrate, in which precipitation of the hydroxide or hydrated oxide of cerium is caused by reaction with acids, such as sulfuric acid. It is preferable to use cerium nitrate as a water-soluble cerium compound, using a sodium hydroxide solution as alkali to react with it. The amount of the cerium compound may be in a common range of about 0.01 to 1.0 mass %, in terms of the total mass of cerium, with respect to the titanium dioxide and/or iron oxide to be used for the metal oxide layer in the present embodiment. More preferably, the cerium compound is added into an aqueous slurry in an amount of about 0.02 to 0.5 mass % with respect to the titanium dioxide and/or iron oxide. The acid or alkali to be used is added into the slurry in an amount sufficient to react with the cerium compound to cause precipitation of the hydroxide or hydrated oxide of cerium on the particles.

<Hydroxide or Hydrated Oxide of Lanthanum>

A hydroxide or hydrated oxide of lanthanum can be precipitated on the particles (the flaky particles coated with titanium dioxide and/or iron oxide) by reacting a water-soluble lanthanum compound with acid or alkali. Examples of the lanthanum compound to be used include mineral acid salts such as lanthanum sulfate, lanthanum chloride, lanthanum nitrate, lanthanum acetate, and lanthanum carbonate. The hydroxide or hydrated oxide of lanthanum can be precipitated by reacting the lanthanum compound with alkali such as an alkali metal hydroxide. It is preferable to use a lanthanum nitrate as a water-soluble lanthanum compound, and use a sodium hydroxide solution as alkali to react with it. The amount of the lanthanum compound to be used may be in a common range of about 0.01 to 1.0 mass %, in terms of the total mass of lanthanum, with respect to the titanium dioxide and/or iron oxide to be used for the metal oxide layer in the present embodiment. More preferably, the lanthanum compound is added into an aqueous slurry in an amount of about 0.02 to 0.5 mass % with respect to the titanium dioxide and/or iron oxide. The acid or alkali to be used is added into the slurry in an amount sufficient to react with the lanthanum compound to cause precipitation of the hydroxide or hydrated oxide of lanthanum on the particles.

<Hydroxide or Hydrated Oxide of Aluminum>

A hydroxide or hydrated oxide of aluminum can be obtained by reacting an acidic or alkaline aluminum compound with an appropriate acid or alkali, so as to be precipitated on the particles (the flaky particles coated with titanium dioxide and/or iron oxide) concurrently with the reaction. Examples of the acidic aluminum compound to be used include mineral acid aluminum salts such as aluminum chloride, aluminum sulfate, and aluminum nitrate. Examples of an alkaline aluminum compound include alkali metal aluminates such as sodium aluminate. The amount of the acidic or alkaline aluminum compound may be in a common range of about 2 to 4 mass %, in terms of the total mass of aluminum, with respect to the titanium dioxide and/or iron oxide to be used for the metal oxide layer in the present embodiment. Preferably, the aluminum compound is added into a slurry in an amount of about 2.5 to 3.5 mass % with respect to the titanium dioxide and/or iron oxide. An appropriate acid or alkali is added into the slurry in an amount sufficient for precipitation of the hydroxide or hydrated oxide of aluminum on the substrates concurrently with or following to the addition of the aluminum compound.

<Surface Treatment Layer>

Preferably, a surface treatment layer is formed as the outermost layer, using an organic compound containing an oxazoline ring and/or silane coupling agent in order to improve adhesion to the matrix resin of a coating film.

Examples of the organic compound containing an oxazoline ring include a polymer containing an oxazoline ring or a polyvalent oxazoline oligomer.

Examples of the polymer containing an oxazoline ring include water-soluble polymers such as EPOCROS WS-500, WS-700, and emulsion polymers such as EPOCROS K-2010, K-2020, K-2030 (manufactured by NIPPON SHOKUBAI CO., LTD.). The water-soluble polymers are particularly preferable because of their high reactivity with base compounds (a matrix resin of a coating film containing a carboxyl group).

Specific examples of the polyvalent oxazoline oligomer as a dioxazoline compound include: 1,6-bis(1,3-oxazoline-2-yl) hexane, 1,8-bis(1,3-oxazoline-2-yl)octane, 1,10-bis(1,3-oxazoline-2-yl)decane, 1,3-bis(1,3-oxazoline-2-yl)cyclohexane, 1,4-bis(1,3-oxazoline-2-yl)cyclohexane, 2,2'-(1,3-phenylene)-bis(2-oxazoline), 2,2'-(1,4-phenylene)-bis(2-oxazoline), 2,2'-(1,2-phenylene)-bis(2-oxazoline), 2,2'-(1,3-phenylene)-bis(4-methyl-2-oxazoline), 2,2'-(1,4-phenylene)-bis(4-methyl-2-oxazoline), 2,2'-(1,2-phenylene)-bis(5-methyl-2-oxazoline), 2,2'-(1,3-phenylene)-bis(5-methyl-2-oxazoline), 2,2'-(1,4-phenylene)-bis(5-methyl-2-oxazoline), 2,2'-(1,3-phenylene)-bis(4-methylphenyl-2-oxazoline), 2,2'-(1,4-phenylene)-bis(4-methylphenyl-2-oxazoline), 2,2'-(1,3-phenylene)-bis(4-chlorophenyl-2-oxazoline), and 2,2'-(1,4-phenylene)-bis(4-chlorophenyl-2-oxazoline). One of these dioxazoline compounds may be used, or two or more of them may be used in combination.

Examples of the other polyvalent oxazoline oligomers include trioxazoline compounds having three oxazoline groups in one molecule, such as 2,2'-(1,2,4-phenylene)-tris-(2-oxazoline). Two or more of these trioxazoline compounds may be used in combination.

The mass percentage of the organic compound containing an oxazoline ring with respect to the total mass (the mass of the whole bright pigment) is preferably 0.01 to 5.0 mass %. If this percentage is less than 0.01 mass %, the compound cannot cover the bright pigment sufficiently, and thus may fail to have the adhesion to the matrix resin of the coating film. On the other hand, if this percentage is over 5.0 mass %, the bright pigment may agglomerate, resulting in lack of proper brightness.

The silane coupling agent may be at least one selected from a vinyl group-containing silane, epoxy group-containing silane, methacryloxy group-containing silane, amino group-containing silane, isocyanate group-containing silane, and mercapto group-containing silane to be used.

Examples of the vinyl group-containing silane include vinyltrichlorosilane, vinyltrimethoxysilane, and vinyltriethoxysilane.

Examples of the epoxy group-containing silane include 2-(3,4-epoxycyclohexyl)ethyltrimethoxysilane, 3-glycidoxy propyltrimethoxysilane, 3-glycidoxy propylmethyldiethoxysilane, and 3-glycidoxy propyltriethoxysilane.

Examples of the methacryloxy group-containing silane include 3-methacryloxy propylmethyldimethoxysilane, 3-methacryloxy propyltrimethoxysilane, 3-methacryloxy propylmethyldiethoxysilane, and 3-methacryloxy propyltriethoxysilane.

Examples of the amino group-containing silane include N-2(aminoethyl)3-aminopropylmethyldimethoxysilane, N-2 (aminoethyl)3-aminopropyltrimethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane.

Examples of the isocyanate group-containing silane include 2-isocyanate ethyltrimethoxysilane, 2-isocyanate ethyltriethoxysilane, 3-isocyanate propyltrimethoxysilane, and 3-isocyanate propyltriethoxysilane.

Examples of the mercapto group-containing silane include 3-mercapto propyltrimethoxysilane.

Examples of the alkoxysilane include trimethylmethoxysilane, trimethylethoxysilane, dimethyldimethoxysilane, dimethyldiethoxysilane, methyltrimethoxysilane, methyltriethoxysilane, methyldimethoxysilane, methyldiethoxysilane, dimethylethoxysilane, dimethylvinylmethoxysilane, dimethylvinylethoxysilane, methylvinyldimethoxysilane, methylvinyldiethoxysilane, diphenyldimethoxysilane, diphenyldiethoxysilane, phenyltrimethoxysilane, phenyltriethoxysilane, tetramethoxysilane, and tetraethoxysilane.

The mass percentage of the silane coupling agent with respect to the total mass (the mass of the whole bright pigment) is preferably 0.01 to 5.0 mass %. If this percentage is less than 0.01 mass %, a sufficient affinity for a paint or resin may not be achieved. On the other hand, if this percentage is over 5.0 mass %, a reaction may take place in the coupling agent, thus decreasing the affinity for the paint or resin. In addition, the cost for providing the bright pigments increases.

Subsequently, an example of the bright coating composition of the present invention will be described. The bright coating composition of the present embodiment can be produced by mixing the above-described bright pigment of the present embodiment with a vehicle.

(Vehicle)

Examples of the main component of the vehicle to be contained in the bright coating composition of the present invention include a resin and a solvent.

It is preferable to use a resin containing a carboxyl group (hereinafter, also referred to as a carboxyl group-containing resin) as the resin. If the vehicle of the bright coating composition of the present invention contains a carboxyl group-containing resin, a metallic layer can be formed, having not only a high hardness and excellent abrasion resistance and chemical resistance, but also a good adhesion to the adherend. The concentration of the resin in the vehicle is not specifically limited, but is, for example, preferably 10 to 70 mass %, more preferably 25 to 50 mass %, with respect to the total amount of the bright coating composition.

Examples of the carboxyl group-containing resin include carboxyl group-containing acrylic acid polymers such as acrylic acid resins (homopolymers), (meth)acrylic acid copolymers, ethylene-(meth)acrylic acid copolymers, vinyl acetate-(meth)acrylic acid copolymers, (meth)acrylate ester-(meth)acrylic acid copolymers, and styrene-(meth)acrylic acid copolymers. Other examples thereof include styrene-butadiene copolymers (styrene-butadiene latex introduced with a carboxyl group, for example), styrene-maleic anhydride copolymers, carboxyl group-containing urethane resins, carboxyl group-containing polyester resins, carboxyl group-containing alkyd resins, and carboxyl group-containing polyvinyl alcohol resins. Still other examples thereof include natural resins such as carboxymethyl cellulose. Furthermore, two-component resins, such as acrylic-modified polyesters, acrylic-modified polyurethanes, and acrylic-modified epoxy resins, also can be used. Hereinafter, carboxyl group-containing acrylic acid polymers and acrylic-modified epoxy resins will be described in detail.

<Carboxyl Group-Containing Acrylic Acid Polymer>

Carboxyl group-containing acrylic acid polymers can be obtained by copolymerization of, for example, acrylic acid esters with aromatic vinyls or vinyl esters. The content of structural units derived from monomers (monomers containing a carboxyl group, wherein the monomers may be salts) in the carboxyl group-containing acrylic acid polymer is preferably 0.2 to 30 mass %, more preferably 1 to 20 mass %, for example. The acid value of the carboxyl group-containing acrylic acid polymer is preferably 2 to 200 mg KOH/g, and more preferably 10 to 100 mg KOH/g.

The weight average molecular weight of the carboxyl group-containing acrylic acid polymer is preferably 1000 to 1000000, more preferably 3000 to 500000, and still more preferably 5000 to 100000. The glass transition temperature of the carboxyl group-containing acrylic acid polymer varies in accordance with the intended use of the resin composition, but the temperature of −60 to 50° C. generally is preferred.

The bright coating composition of the present invention preferably contains a carboxyl group-containing acrylic acid polymer having a glass transition temperature of −10 to 50° C.

<Acrylic-Modified Epoxy Resin>

In an acrylic-modified epoxy resin, an acrylic vinyl copolymer is introduced to an epoxy resin as a main chain. The carboxyl groups are bonded with the vinyl copolymer.

An acrylic-modified epoxy resin containing a carboxyl group can be obtained by esterification reaction between a vinyl copolymer and an epoxy resin in a hydrophilic organic solvent in the presence of a basic compound. There is no particular limitation on ethylenically unsaturated carboxylic acid monomers that are the source materials of the vinyl copolymer. Examples thereof include acrylic acid, methacrylic acid, maleic acid, fumaric acid, and itaconic acid. Two or more of these may be used. There is no particular limitation on the method of polymerizing these monomer components. For example, they may be polymerized using commonly-used radical polymerization initiator such as azobisisobutyronitrile, and benzoyl peroxide.

The epoxy resin is preferably at least one selected from a bisphenol F type epoxy resin, a bisphenol A type epoxy resin, and a hydrogenerated bisphenol A type epoxy resin. In addition, the epoxy resin preferably has an average of 1.1 to 2.0 epoxy groups in one molecule, as well as a number average molecular weight of 900 or more.

The weight average molecular weight of the acrylic-modified epoxy resin is preferably 2000 to 100000, for example. The acrylic-modified epoxy resin having a weight average molecular weight of 2000 to 100000 has excellent emulsification dispersion performance, and thus gelation thereof hardly occurs during the reaction between the acrylic vinyl copolymer and the epoxy resin.

<Solvent>

In the case that the solvent included in the vehicle is an organic solvent, examples of the organic solvent include: alcohols (such as methanol, ethanol, propanol, isopropanol, and n-butanol); aliphatic hydrocarbons (such as hexane, heptane, octane); alicyclic hydrocarbons (such as cyclohexane); aromatic hydrocarbons (such as benzene, toluene, xylene); esters (such as ethyl acetate, n-butyl acetate, isobutyl acetate, and n-butyl acetate); ketones (such as acetone, methyl ethyl ketone, and methyl isobutyl ketone); ethers (such as diethyl ether, dioxane, and tetrahydrofuran); cellosolves (such as methyl cellosolve (ethylene glycol monomethyl ether), ethyl cellosolve, propyl cellosolve, butyl cellosolve, phenyl cellosolve, and benzyl cellosolve); and carbitols (such as diethylene glycol monomethyl ether, carbitol (diethylene glycol monoethyl ether), and diethylene glycol monopropyl ether). A mixed solvent thereof also can be used.

In the case that the solvent included in the vehicle is water, if the vehicle further includes alkali, the resin can be dissolved in water. Examples of the alkali include: organic bases such as aliphatic amines (e.g., trimethylamine, triethylamine, ethylenediamine); alkanolamines such as ethanolamine, diethanolamine, dimethylethanolamine, triethanolamine; heterocyclic amines such as morpholine; ammonia; and inorganic bases such as alkali metal compounds (e.g., sodium hydroxide, and potassium hydroxide). Among these, ammonia, diethanolamine, dimethylethanolamine, and triethanolamine are preferred.

In the case that the solvent included in the vehicle is water, it is desirable that the acidic group (e.g., a carboxyl group) contained in the resin(e.g., carboxyl group-containing acrylic acid polymer) be neutralized by a base to the extent that the resin can be water-dispersed. The percentage of the acidic groups to be neutralized is desirably about 50% of all the acidic groups. For example, supposing that the total number of moles of the acidic groups contained in the resin is 1, amine with 0.4 to 2.0 times the number of moles, preferably amine with 0.6 to 1.4 times the number of moles, may be used for the neutralization of the acidic groups.

The aqueous emulsion can be prepared by a commonly-used method. One example is a method in which a part of the carboxyl groups in the carboxyl group-containing acrylic acid polymer is neutralized by a base for dispersion of the carboxyl group-containing acrylic acid polymer in water. The aqueous emulsion may be prepared by an emulsion polymerization method. For the emulsion polymerization, commonly-used emulsifying agents (for example, anionic surfactants, nonionic surfactants, and protective colloids such as polyvinyl alcohols and water-soluble polymers) may be used. The pH of the aqueous emulsion may be adjusted using a pH adjuster.

<Cross-Linking Curing Agent>

The vehicle constituting the bright coating composition of the present invention further may contain a cross-linking curing agent. As a cross-linking curing agent, an amino resin and/or a polyisocyanate compound can be used.

When the resin constituting the vehicle has a hydroxyl group, this hydroxyl group reacts with a cross-linking agent such as an amino resin and a polyisocyanate compound, thereby allowing the resin to be cured. The amino resin and/or the polyisocyanate compound undergoes a cross-linking reaction also with a carboxyl group, amino group, and the like having an active hydrogen.

Examples of the amino resin that is an example of the cross-linking curing agent include melamine resins such as an alkyletherified melamine resin, benzoguanamine resins such as an alkyletherified benzoguanamine resin, and urea resins such as an alkyletherified urea resin. Among these, melamine resins are preferred. Specific examples of the melamine resins include dimethylol melamine, trimethylol melamine, tetramethylol melamine, pentamethylol melamine, and hexamethylol melamine. Furthermore, the amino resins may be alkyletherified products of these melamine resins (e.g., methyl ether, ethyl ether, propyl ether, isopropyl ether, butyl ether, isobutyl ether, etc.), urea-formamide condensation products, or urea-melamine condensation products. Two or more of these amino resins may be used in combination.

It is preferable that the content of the amino resin be set, for example, so that the mass ratio between the resin (solid content) that constitutes the vehicle and the amino resin (solid content) is 95/5 to 60/40. It is more preferable that the content thereof be set so that the mass ratio is 85/15 to 65/35. Such setting allows the coating film formed by applying the paint to have high strength as well as high corrosion resistance.

As a polyisocyanate compound that is an example of the cross-linking curing agent, for example, a blocked polyisocyanate compound in which the isocyanate groups in polyisocyanate are masked with a blocking agent is suitable. Examples of the polyisocyanate compound include HDIs (such as hexamethylene diisocyanate), TDIs (such as tolylene diisocyanate), XDIs (such as xylylene diisocyanate), and MDIs (such as diphenylmethane diisocyanate). Examples of the blocking agent include oxime and lactam.

When the above-mentioned polyisocyanate compound is a blocked polyisocyanate compound, it is preferable that the content thereof is set so that the molar ratio between the hydroxyl groups contained in the resin constituting the vehicle and the deblocked and regenerated isocyanate groups in the polyisocyanate compound (the number of moles of hydroxyl groups/the number of moles of regenerated isocyanate groups) is 100/20 to 100/150.

Other thermoplastic resins (such as an acrylic resin and a polyester resin containing no carboxyl group), and thermosetting resins (such as an urethane resin and an amino resin), and various additives such as antioxidants, ultraviolet absorbers, stabilizers such as heat stabilizers, plasticizers, antistatic agents, dispersants, antiskinning agents, viscosity modifiers such as thickeners, planarizers, antidripping agents, fungicides, preservatives, fillers, dyes and pigments (such as phthalocyanine pigment, perylene pigment, quinacridone pigment, indigo pigment, isoindolinone pigment, colcothar, yellow iron oxide, and carbon black) may be added to the vehicle of the bright coating composition of the present invention depending on the intended use.

Embodiments of the automotive body coating of the present invention will be described below. The automotive body coating of the present embodiment includes a metallic base layer containing 0.01 to 30 mass % of the above-described bright pigment of the present embodiment. The automotive body coating of the present embodiment may include other layers (for example, a clear layer that can be produced by applying a clear paint) than the metallic base layer.

In applying the paint to automotive bodies, there are methods to be employed such as a so-called "two-coat one-bake method" as a normal method for forming a laminated coating film, and a so-called "three-coat two-bake method" or a so-called "three-coat one-bake method" as a method for forming a laminated coating film with an improved masking property.

According to the "two-coat one-bake method", first, a metallic base paint containing a metallic pigment called an overcoat (which is equivalent to the bright pigment in the present invention) is applied onto a coated plate that has been subjected to undercoating and intermediate coating. Next, a clear paint is applied thereto in layers by wet-on-wet coating without curing of the metallic base paint. Then, the clear coating film and the metallic base coating film are cured simultaneously.

In the "three-coat two-bake method", a color base paint called an overcoat is applied onto a coated plate that has been subjected to undercoating and intermediate coating, followed by baking and curing. Subsequently, a metallic base paint containing a metallic pigment is applied thereto, and a clear paint is applied in layers by wet-on-wet coating without curing of the metallic base paint. Finally, the clear coating film and the metallic base coating film are cured simultaneously.

In the "three-coat one-bake method", a color base paint called an overcoat is applied onto a coated plate that has been subjected to undercoating and intermediate coating, and a metallic base paint containing a metallic pigment is applied thereto without curing of the color base paint. Subsequently, a clear paint is applied in layers by wet-on-wet coating without baking and curing of the metallic base paint as well. Finally, the clear coating film, the metallic base coating film, and the color base coating film are cured simultaneously.

Figure 4:
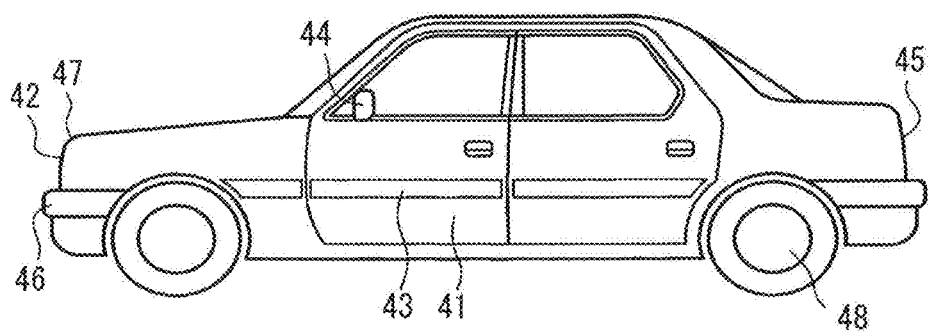
FIG. 4 is a side view showing an example of a vehicle provided with an example of the automotive body coating of the present invention.

Examples of products coated with the automotive body coating of the present invention includes, as shown in FIG. 4, a body 41 that is the exterior of an automobile, a radiator grille 42, side moldings 43, door mirrors 44, a back panel 45, a bumper 46, an emblem 47, wheel covers 48, or the like. Hereinafter, an example coated with the automotive body coating of the present invention will be described by way of the example of the body 41.

Figure 5:
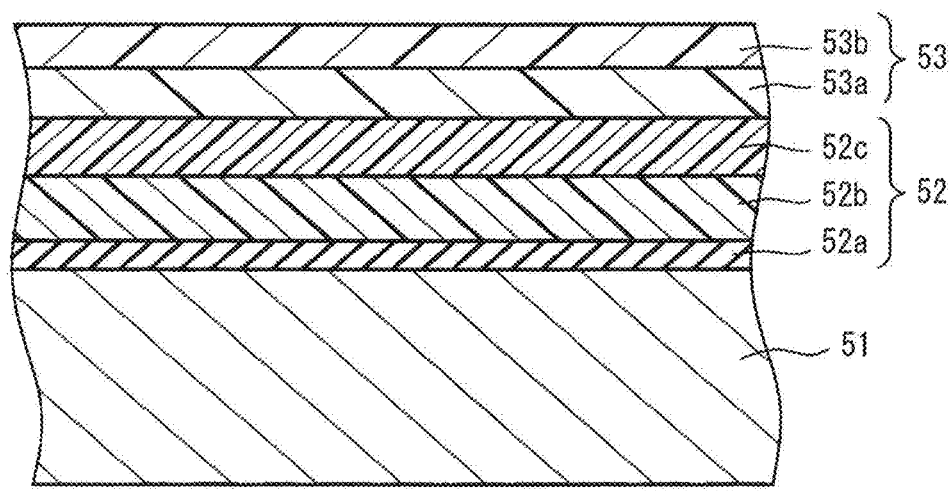
FIG. 5 is a schematic cross-sectional view showing an example of the automotive body coating of the present invention.

On one main surface of a steel plate 51 in the body, as shown in FIG. 5, undercoat layers 52 and overcoat layers 53 are formed in this order. The undercoat layers 52 include a chemical conversion layer 52a, a cationic electrodeposition layer 52b, and an intermediate layer 52c, in this order from the side of the steel plate 51. In the case of employing the two-coat one-bake method, the overcoat layers 53 include a metallic base layer 53a containing the bright pigment of the present invention and a clear layer 53b, in this order from the side of the steel plate 51. The automotive body coating of this examples of the present invention includes the metallic base layer 53a that is formed by a composition containing the bright pigment of the present invention (the bright coating composition of the present invention). Therefore, no mixture of various colors resulting from the difference of the thickness of each particle in the flaky particles appears therein, and thereby the particles are prevented from glowing with rainbow colors. As a result, it has an appearance with a favorable coating finish.

In the present invention, the material and forming method for the chemical conversion layer 52a, the cationic electrodeposition layer 52b, the intermediate layer 52c, and top clear layer 53b are not specifically limited and may be the same as the conventionally known ones. The following is an example for each layer.

The chemical conversion layer 52a is provided to prevent the corrosion of the steel plate 51. The chemical conversion layer 52a is composed of, for example, a zinc phosphate coating layer.

The cationic electrodeposition layer 52b is provided to improve the corrosion resistance of the steel plate 51 as well as the stability of layers to be formed above the cationic electrodeposition layer 52b, and to facilitate the formation of the layers to be formed above the cationic electrodeposition layer 52b. The cationic electrodeposition layer 52b is composed of, for example, a cured coating film containing an acrylic/urethane resin.

The intermediate layer 52c is provided to enhance the adhesion between the layer below the intermediate layer 52c and the layer above it, and to improve the chipping resistance of the layer above the intermediate layer 52c. The intermediate layer 52c is composed of, for example, a cured coating film containing an acrylic/urethane resin.

The clear layer 53b is provided to give a lustrous appearance, and to improve the fouling resistance. The clear layer 53b is composed of, for example, a cured coating film containing an acrylic/urethane resin.

EXAMPLES

Hereinafter, the present invention is described in further detail using examples and comparative examples, however, the present invention is not limited to the following description.

Example 1

The bright pigment of Example 1 is glass flakes (with an average thickness of 1.3 μm) each coated with rutile-type titanium dioxide.

Glass flakes were produced using a device shown in FIG. 1. Specifically, first, C glass was melted at 1200° C., stretched while being inflated into a hollow shape to form a thin film, and cooled to be solidified. It was crushed using rolls, and thus glass flakes with an average thickness of 1.3 µm were obtained. The glass flakes thus obtained were pulverized using a jet mill type pulverizer with the intention that the glass flakes had an average particle size of 20 µm. Thus, the glass flakes having an average particle size D50 of 21.7 µm were produced. The maximum particle size at this time was 96.0 µm.

These glass flakes were classified. Using a sieve with a mesh opening of 20 µm, and arranging a receiving tray below the sieve, they were sieved for a predetermined time period so that coarse particles were removed. The glass flakes received by the receiving tray each were used as a substrate (a flaky particle) of the bright pigment of the present example. The particle size distribution of the glass flakes thus obtained was measured. The average particle size (D50) was 17.3 µm, the refractive index was 1.54, the frequency of the glass flakes having a thickness in the range of 0.8 to 1.9 µm was 97%, the cumulative volume from the smaller particle size to the particle size of 48 µm was 99.4%, and the cumulative volume from the smaller particle size to the particle size of 62 µm was 100%.

Next, the classified glass flakes were coated with titanium oxide. Ion-exchanged water was added to 50 g of the glass flakes so that the total amount thereof was 0.5 L, and then it was heated to 75° C. while adjusting the pH to 1.0 with 35 mass % of hydrochloric acid. Under stirring, an aqueous titanium tetrachloride solution (containing 16.5 mass % of titanium) was added quantitatively at a rate of 12 g per hour, and an aqueous caustic soda solution containing caustic soda of 10 mass % was also added at a rate of 60 mL per hour continuously until a product with brightness and silver pearl tone was obtained.

After a product with the target color tone was obtained, the product was collected by filtration under reduced pressure, washed with pure water, dried at 150° C., and baked at 600° C.

Thus, glass flakes each having the surface coated with a titanium oxide coating layer were obtained as the bright pigment of Example 1.

The obtained bright pigment of Example 1 had an average particle size (D50) of 17.2 µm. The cumulative volume from the smaller particle size to the particle size of 48 µm thereof was 99.5%, and the cumulative volume from the smaller particle size to the particle size of 62 µm thereof was 100%.

Example 2

The bright pigment of Example 2 is glass flakes (with an average thickness of 1.0 µm) each coated with rutile-type titanium dioxide.

Glass flakes were produced using a device shown in FIG. 1 in the same manner as in Example 1, except that the average thickness thereof was adjusted to 1.0 µm. The glass flakes thus obtained were pulverized using a jet mill type pulverizer with the intention that the glass flakes had an average particle size of 20 µm. Thus, the glass flakes having an average particle size D50 of 20.9 µm were produced. The maximum particle size at this time was 94.2 µm.

These glass flakes were classified. Using a sieve with a mesh opening of 20 µm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 19.3 µm, the refractive index was 1.54, the frequency of the glass flakes having a thickness in the range of 0.8 to 1.9 µm was 91%, the cumulative volume from the smaller particle size to the particle size of 48 µm was 99.1%, and the cumulative volume from the smaller particle size to the particle size of 62 µm was 100%.

Thereafter, glass flakes including a titanium oxide coating layer with brightness and silver pearl tone were obtained as the bright pigment of Example 2, in the same manner as in Example 1.

The obtained bright pigment of Example 2 had an average particle size (D50) of 19.2 µm. The cumulative volume from the smaller particle size to the particle size of 48 µm thereof was 99.2%, and the cumulative volume from the smaller particle size to the particle size of 62 µm thereof was 100%.

Example 3

The bright pigment of Example 3 is glass flakes (with an average thickness of 1.5 µm) each coated with rutile-type titanium dioxide.

Glass flakes were produced using a device shown in FIG. 1 in the same manner as in Example 1, except that the average thickness thereof was adjusted to 1.5 µm. The glass flakes thus obtained were pulverized using a jet mill type pulverizer with the intention that the glass flakes had an average particle size of 20 µm. Thus, the glass flakes having an average particle size D50 of 21.9 µm were produced. The maximum particle size at this time was 97.4 µm.

These glass flakes were classified. Using a sieve with a mesh opening of 20 µm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 19.9 µm, the refractive index was 1.54, the frequency of the glass flakes having a thickness in the range of 0.8 to 1.9 µm was 90%, the cumulative volume from the smaller particle size to the particle size of 48 µm was 99.1%, and the cumulative volume from the smaller particle size to the particle size of 62 µm was 100%.

Thereafter, glass flakes including a titanium oxide coating layer with brightness and silver pearl tone were obtained as the bright pigment of Example 3, in the same manner as in Example 1.

The obtained bright pigment of Example 3 had an average particle size (D50) of 19.7 µm. The cumulative volume from the smaller particle size to the particle size of 48 µm thereof was 99.1%, and the cumulative volume from the smaller particle size to the particle size of 62 µm thereof was 100%.

Comparative Example 1

The bright pigment of Comparative Example 1 is glass flakes (with an average thickness of 0.7 µm) each coated with rutile-type titanium dioxide.

Glass flakes were produced using a device shown in FIG. 1 in the same manner as in Example 1, except that the average thickness thereof was adjusted to 0.7 µm. The glass flakes thus obtained were pulverized using a jet mill type pulverizer with the intention that the glass flakes had an average particle size of 20 µm. Thus, the glass flakes having an average particle size D50 of 23.3 µm were produced. The maximum particle size at this time was 93.5 µm.

These glass flakes were classified. Using a sieve with a mesh opening of 45 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 22.1 μm, the refractive index was 1.54, the frequency of the glass flakes having a thickness in the range of 0.8 to 1.9 μm was 81%, the cumulative volume from the smaller particle size to the particle size of 48 μm was 98.2%, and the cumulative volume from the smaller particle size to the particle size of 62 μm was 99.5%. That is, for the glass flakes used in Comparative Example 1, the particle size at 99% of the cumulative volume from the smaller particle size was over 48 μm, and the maximum particle size was over 62 μm. In addition, the frequency of the glass flakes having a thickness in the range of 0.8 to 1.9 μm was less than 90% by volume.

Thereafter, glass flakes including a titanium oxide coating layer with brightness and silver pearl tone were obtained as the bright pigment of Comparative Example 1, in the same manner as in Example 1.

The obtained bright pigment of Comparative Example 1 had an average particle size (D50) of 22.0 μm. The cumulative volume from the smaller particle size to the particle size of 48 μm thereof was 98.4%, and the cumulative volume from the smaller particle size to the particle size of 62 μm thereof was 99.7%.

Comparative Example 2

The bright pigment of Comparative Example 2 is glass flakes (with an average thickness of 1.3 μm) each coated with rutile-type titanium dioxide.

Glass flakes were produced using a device shown in FIG. 1 in the same manner as in Example 1, except that the average thickness thereof was adjusted to 1.3 μm. The glass flakes thus obtained were pulverized using a jet mill type pulverizer with the intention that the glass flakes had an average particle size of 20 μm. Thus, the glass flakes having an average particle size D50 of 22.9 μm were produced. The maximum particle size at this time was 96.5 μm.

These glass flakes were classified. Using a sieve with a mesh opening of 45 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 22.1 μm, the refractive index was 1.54, the frequency of the glass flakes having a thickness in the range of 0.8 to 1.9 μm was 97%, the cumulative volume from the smaller particle size to the particle size of 48 μm was 98.5%, and the cumulative volume from the smaller particle size to the particle size of 62 μm was 99.7%. That is, for the glass flakes used in Comparative Example 2, the particle size at 99% of the cumulative volume from the smaller particle size was over 48 μm, and the maximum particle size was over 62 μm.

Thereafter, glass flakes including a titanium oxide coating layer with brightness and silver pearl tone were obtained as a bright pigment, in the same manner as in Example 1.

The obtained bright pigment of Comparative Example 2 had an average particle size (D50) of 21.9 μm. The cumulative volume from the smaller particle size to the particle size of 48 μm thereof was 98.6%, and the cumulative volume from the smaller particle size to the particle size of 62 μm thereof was 99.8%.

Comparative Example 3

The bright pigment of Comparative Example 3 is glass flakes (with an average thickness of 0.7 μm) each coated with rutile-type titanium dioxide.

Glass flakes were produced using a device shown in FIG. 1 in the same manner as in Example 1, except that the average thickness thereof was adjusted to 0.7 μm. The glass flakes thus obtained were pulverized using a jet mill type pulverizer with the intention that the glass flakes had an average particle size of 20 μm. Thus, the glass flakes having an average particle size D50 of 21.7 μm were produced. The maximum particle size at this time was 97.1 μm.

These glass flakes were classified. Using a sieve with a mesh opening of 20 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 19.7 μm, the refractive index was 1.54, the frequency of the glass flakes having a thickness in the range of 0.8 to 1.9 μm was 80%, the cumulative volume from the smaller particle size to the particle size of 48 μm was 99.2%, and the cumulative volume from the smaller particle size to the particle size of 62 μm was 100%. That is, for the glass flakes used in Comparative Example 3, the frequency of the glass flakes having a thickness in the range of 0.8 to 1.9 μm was less than 90%.

Thereafter, glass flakes including a titanium oxide coating layer with brightness and silver pearl tone were obtained as a bright pigment, in the same manner as in Example 1.

The obtained bright pigment of Comparative Example 3 had an average particle size (D50) of 19.6 μm. The cumulative volume from the smaller particle size to the particle size of 48 μm thereof was 99.3%, and the cumulative volume from the smaller particle size to the particle size of 62 μm thereof was 100%.

Comparative Example 4

The bright pigment of Comparative Example 4 is glass flakes (with an average thickness of 1.3 μm) each coated with rutile-type titanium dioxide.

Glass flakes were produced using a device shown in FIG. 1 in the same manner as in Example 1, except that the average thickness thereof was adjusted to 1.3 μm. The glass flakes thus obtained were pulverized using a jet mill type pulverizer with the intention that the glass flakes had an average particle size of 20 μm. Thus, the glass flakes having an average particle size D50 of 21.8 μm were produced. The maximum particle size at this time was 87.5 μm.

These glass flakes were classified. Using a sieve with a mesh opening of 38 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 20.7 μm, the refractive index was 1.54, the frequency of the glass flakes having a thickness in the range of 0.8 to 1.9 μm was 97%, the cumulative volume from the smaller particle size to the particle size of 48 μm was 99.0%, and the cumulative volume from the smaller particle size to the particle size of 62 μm was 99.8%. That is, the maximum particle size of the glass flakes used in Comparative Example 4 was over 62 μm.

Thereafter, glass flakes including a titanium oxide coating layer with brightness and silver pearl tone were obtained as a bright pigment, in the same manner as in Example 1.

The obtained bright pigment of Comparative Example 4 had an average particle size (D50) of 20.5 μm. The cumulative volume from the smaller particle size to the particle size of 48 μm thereof was 99.1%, and the cumulative volume from the smaller particle size to the particle size of 62 μm thereof was 99.8%.

Comparative Example 5

The bright pigment of Comparative Example 5 is glass flakes (with an average thickness of 1.3 μm) each coated with rutile-type titanium dioxide.

Glass flakes were produced using a device shown in FIG. 1 in the same manner as in Example 1, except that the average thickness thereof was adjusted to 1.3 μm. The glass flakes thus obtained were pulverized using a jet mill type pulverizer with the intention that the glass flakes had an average particle size of 20 μm. Thus, the glass flakes having an average particle size D50 of 22.2 μm were produced. The maximum particle size at this time was 87.5 μm.

These glass flakes were classified. Using a sieve with a mesh opening of 32 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 20.5 μm, the refractive index was 1.54, the frequency of the glass flakes having a thickness in the range of 0.8 to 1.9 μm was 96%, the cumulative volume from the smaller particle size to the particle size of 48 μm was 98.8%, and the cumulative volume from the smaller particle size to the particle size of 62 μm was 100%. That is, for the glass flakes used in Comparative Example 5, the particle size at 99% of the cumulative volume from the smaller particle size was over 48 μm.

Thereafter, glass flakes including a titanium oxide coating layer with brightness and silver pearl tone were obtained as a bright pigment, in the same manner as in Example 1.

The obtained bright pigment of Comparative Example 5 had an average particle size (D50) of 20.4 μm. The cumulative volume from the smaller particle size to the particle size of 48 μm thereof was 98.9%, and the cumulative volume from the smaller particle size to the particle size of 62 μm thereof was 100%.

Example 4

The bright pigment of Example 4 is glass flakes (with an average thickness of 0.05 μm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.05 μm were obtained. The glass flakes thus obtained were pulverized using a jet mill type pulverizer with the intention that the glass flakes had an average particle size of 20 μm. Thus, the glass flakes having an average particle size D50 of 20.1 μm were produced. The maximum particle size at this time was 92.2 μm.

These glass flakes were classified. They were classified in the same manner as in Example 1, using a sieve with a mesh opening of 20 μm, and arranging a receiving tray below the sieve, so that coarse particles were removed, except that they were sieved for a longer time period than in Example 1. The particle size distribution of the glass flakes received by the receiving tray was measured. For the obtained glass flakes, the average particle size (D50) was 17.3 μm, the refractive index was 1.54, the frequency of the glass flakes having a thickness in the range of 0.01 to 0.1 μm was 97%, the cumulative volume from the smaller particle size to the particle size of 48 μm was 99.4%, and the cumulative volume from the smaller particle size to the particle size of 62 μm was 100%.

Thereafter, glass flakes including a titanium oxide coating layer with brightness and silver pearl tone were obtained as the bright pigment of Example 4, in the same manner as in Example 1.

The obtained bright pigment of Example 4 had an average particle size (D50) of 17.2 μm. The cumulative volume from the smaller particle size to the particle size of 48 μm thereof was 99.5%, and the cumulative volume from the smaller particle size to the particle size of 62 μm thereof was 100%.

Example 5

The bright pigment of Example 5 is glass flakes (with an average thickness of 0.07 μm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.07 μm were obtained. The glass flakes thus obtained were pulverized using a jet mill type pulverizer with the intention that the glass flakes had an average particle size of 20 μm. Thus, the flaky particles having an average particle size D50 of 20.5 μm were produced. The maximum particle size at this time was 92.6 μm.

These glass flakes were classified. They were classified in the same manner as in Example 1, using a sieve with a mesh opening of 20 μm, and arranging a receiving tray below the sieve, so that coarse particles were removed, except that they were sieved for a longer time period than in Example 1. The particle size distribution of the glass flakes received by the receiving tray was measured. For the obtained glass flakes, the average particle size (D50) was 18.3 μm, the refractive index was 1.54, the frequency of the glass flakes having a thickness in the range of 0.01 to 0.1 μm was 91%, the cumulative volume from the smaller particle size to the particle size of 48 μm was 99.1%, and the cumulative volume from the smaller particle size to the particle size of 62 μm was 100%.

Thereafter, glass flakes including a titanium oxide coating layer with brightness and silver pearl tone were obtained as the bright pigment of Example 5, in the same manner as in Example 1.

The obtained bright pigment of Example 5 had an average particle size (D50) of 18.1 µm. The cumulative volume from the smaller particle size to the particle size of 48 µm thereof was 99.2%, and the cumulative volume from the smaller particle size to the particle size of 62 µm thereof was 100%.

Comparative Example 6

The bright pigment of Comparative Example 6 is glass flakes (with an average thickness of 0.27 µm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.27 µm were obtained. The glass flakes thus obtained were pulverized using a jet mill type pulverizer with the intention that the glass flakes had an average particle size of 20 µm. Thus, the flaky particles having an average particle size D50 of 21.1 µm were produced. The maximum particle size at this time was 94.0 µm.

These glass flakes were classified. Using a sieve with a mesh opening of 20 µm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained flaky particles, the average particle size (D50) was 18.1 µm, the refractive index was 1.54, the frequency of the glass flakes having a thickness in the range of 0.01 to 0.1 µm was 55%, the cumulative volume from the smaller particle size to the particle size of 48 µm was 99.1%, and the cumulative volume from the smaller particle size to the particle size of 62 µm was 100%. That is, for the glass flakes used in Comparative Example 6, the frequency of the glass flakes having a thickness in the range of 0.01 to 0.1 µm was less than 90% by volume.

Thereafter, glass flakes including a titanium oxide coating layer with brightness and silver pearl tone were obtained as the bright pigment of Comparative Example 6, in the same manner as in Example 1.

The obtained bright pigment of Comparative Example 6 had an average particle size (D50) of 18.0 µm. The cumulative volume from the smaller particle size to the particle size of 48 µm thereof was 99.1%, and the cumulative volume from the smaller particle size to the particle size of 62 µm thereof was 100%.

Comparative Example 7

The bright pigment of Comparative Example 7 is glass flakes (with an average thickness of 0.3 µm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.3 µm were obtained. The glass flakes thus obtained were pulverized using a jet mill type pulverizer with the intention that the glass flakes had an average particle size of 20 µm. Thus, the glass flakes having an average particle size D50 of 21.5 µm were produced. The maximum particle size at this time was 94.3 µm.

These glass flakes were classified. Using a sieve with a mesh opening of 45 µm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 19.8 µm, the refractive index was 1.54, the frequency of the glass flakes having a thickness in the range of 0.01 to 0.1 µm was 40%, the cumulative volume from the smaller particle size to the particle size of 48 µm was 98.5%, and the cumulative volume from the smaller particle size to the particle size of 62 µm was 99.9%. That is, for the glass flakes used in Comparative Example 7, the particle size at 99% of the cumulative volume from the smaller particle size was over 48 µm, and the maximum particle size was over 62 µm. In addition, the frequency of the glass flakes having a thickness in the range of 0.01 to 0.1 µm was less than 90% by volume.

Thereafter, glass flakes including a titanium oxide coating layer with brightness and silver pearl tone were obtained as the bright pigment of Comparative Example 7, in the same manner as in Example 1.

The obtained bright pigment of Comparative Example 7 had an average particle size (D50) of 19.8 µm. The cumulative volume from the smaller particle size to the particle size of 48 µm thereof was 98.6%, and the cumulative volume from the smaller particle size to the particle size of 62 µm thereof was 99.9%.

Comparative Example 8

The bright pigment of Comparative Example 8 is glass flakes (with an average thickness of 0.07 µm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.07 µm were obtained. The glass flakes thus obtained were pulverized using a jet mill type pulverizer with the intention that the glass flakes had an average particle size of 20 µm. Thus, the glass flakes having an average particle size D50 of 21.8 µm were produced. The maximum particle size at this time was 94.3 µm.

These glass flakes were classified. Using a sieve with a mesh opening of 38 µm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 20.4 μm, the refractive index was 1.54, the frequency of the glass flakes having a thickness in the range of 0.01 to 0.1 μm was 90%, the cumulative volume from the smaller particle size to the particle size of 48 μm was 99.1%, and the cumulative volume from the smaller particle size to the particle size of 62 μm was 99.7%. That is, the maximum particle size of the glass flakes used in Comparative Example 8 was over 62 μm.

Thereafter, glass flakes including a titanium oxide coating layer with brightness and silver pearl tone were obtained as the bright pigment of Comparative Example 8, in the same manner as in Example 1.

The obtained bright pigment of Comparative Example 8 had an average particle size (D50) of 20.3 μm. The cumulative volume from the smaller particle size to the particle size of 48 μm thereof was 99.1%, and the cumulative volume from the smaller particle size to the particle size of 62 μm thereof was 99.7%.

Comparative Example 9

The bright pigment of Comparative Example 9 is glass flakes (with an average thickness of 0.07 μm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.07 μm were obtained. The glass flakes thus obtained were pulverized using a jet mill type pulverizer with the intention that the glass flakes had an average particle size of 20 μm. Thus, the glass flakes having an average particle size D50 of 21.8 μm were produced. The maximum particle size at this time was 94.8 μm.

These glass flakes were classified. Using a sieve with a mesh opening of 32 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 20.6 μm, the refractive index was 1.54, the frequency of the glass flakes having a thickness in the range of 0.01 to 0.1 μm was 91%, the cumulative volume from the smaller particle size to the particle size of 48 μm was 98.7%, and the cumulative volume from the smaller particle size to the particle size of 62 μm was 100%. That is, for the glass flakes used in Comparative Example 9, the particle size at 99% of the cumulative volume from the smaller particle size was over 48 μm.

Thereafter, glass flakes including a titanium oxide coating layer with brightness and silver pearl tone were obtained as the bright pigment of Comparative Example 9, in the same manner as in Example 1.

The obtained bright pigment of Comparative Example 9 had an average particle size (D50) of 20.5 μm. The cumulative volume from the smaller particle size to the particle size of 48 μm thereof was 98.8%, and the cumulative volume from the smaller particle size to the particle size of 62 μm thereof was 100%.

Example 6

The bright pigment of Example 6 is glass flakes (with an average thickness of 0.2 μm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.2 μm were obtained. The glass flakes thus obtained were pulverized using a jet mill type pulverizer with the intention that the glass flakes had an average particle size of 20 μm. Thus, the glass flakes having an average particle size D50 of 20.6 μm were produced. The maximum particle size at this time was 92.5 μm.

These glass flakes were classified. Using a sieve with a mesh opening of 20 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 17.9 μm, the refractive index was 1.54, the frequency of the glass flakes having a thickness in the range of 0.01 to 0.35 μm was 92%, the cumulative volume from the smaller particle size to the particle size of 48 μm was 99.4%, and the cumulative volume from the smaller particle size to the particle size of 62 μm was 100%.

Thereafter, glass flakes including a titanium oxide coating layer with brightness and silver pearl tone were obtained as the bright pigment of Example 6, in the same manner as in Example 1.

The obtained bright pigment of Example 6 had an average particle size (D50) of 17.8 μm. The cumulative volume from the smaller particle size to the particle size of 48 μm thereof was 99.5%, and the cumulative volume from the smaller particle size to the particle size of 62 μm thereof was 100%.

Example 7

The bright pigment of Example 7 is glass flakes (with an average thickness of 0.24 μm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.24 μm were obtained. The glass flakes thus obtained were pulverized using a jet mill type pulverizer with the intention that the glass flakes had an average particle size of 20 μm.

Thus, the glass flakes having an average particle size D50 of 20.8 μm were produced. The maximum particle size at this time was 93.9 μm.

These glass flakes were classified. Using a sieve with a mesh opening of 20 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained glass flakes, the average particle size (D50) was 18.3 μm, the refractive index was 1.54, the frequency of the glass flakes having a thickness in the range of 0.01 to 0.35 μm was 90%, the cumulative volume from the smaller particle size to the particle size of 48 μm was 99.1%, and the cumulative volume from the smaller particle size to the particle size of 62 μm was 100%.

Thereafter, glass flakes including a titanium oxide coating layer with brightness and silver pearl tone were obtained as the bright pigment of Example 7, in the same manner as in Example 1.

The obtained bright pigment of Example 7 had an average particle size (D50) of 18.1 μm. The cumulative volume from the smaller particle size to the particle size of 48 μm thereof was 99.2%, and the cumulative volume from the smaller particle size to the particle size of 62 μm thereof was 100%.

Comparative Example 10

The bright pigment of Comparative Example 10 is glass flakes (with an average thickness of 0.27 μm) each coated with rutile-type titanium dioxide.

A device for producing glass flakes by molten glass flow shown in FIG. 2 was used. First, a tapered cup mounted to a variable-speed electric motor was rotated at a particular speed, and molten C glass was poured into the cup from above. The molten glass in the cup was drawn outward over the rim by the centrifugal force, and then was crushed into small glass flakes while being kept flat by the airflow. The glass flakes thus obtained were collected in a chamber and delivered to a cyclone collection/filtration section, and cooled to be solidified. Thus, glass flakes with an average thickness of 0.27 μm were obtained. The glass flakes thus obtained were pulverized using a jet mill type pulverizer with the intention that the glass flakes had an average particle size of 20 μm. Thus, the flaky particles having an average particle size D50 of 21.1 μm were produced. The maximum particle size at this time was 94.0 μm.

These glass flakes were classified. Using a sieve with a mesh opening of 20 μm, and arranging a receiving tray below the sieve, they were classified so that coarse particles were removed, in the same manner as in Example 1 except that they were sieved for a longer time period than in Example 1. The particle size distribution of the glass flakes received by the receiving tray was measured. For the obtained flaky particles, the average particle size (D50) was 18.1 μm, the refractive index was 1.54, the frequency of the glass flakes having a thickness in the range of 0.01 to 0.35 μm was 85%, the cumulative volume from the smaller particle size to the particle size of 48 μm was 99.1%, and the cumulative volume from the smaller particle size to the particle size of 62 μm was 100%. That is, for the glass flakes used in Comparative Example 10, the frequency of the glass flakes having a thickness in the range of 0.01 to 0.35 μm was less than 90% by volume.

Thereafter, glass flakes including a titanium oxide coating layer with brightness and silver pearl tone were obtained as the bright pigment of Comparative Example 10, in the same manner as in Example 1.

The obtained bright pigment of Comparative Example 10 had an average particle size (D50) of 18.0 μm. The cumulative volume from the smaller particle size to the particle size of 48 μm thereof was 99.2%, and the cumulative volume from the smaller particle size to the particle size of 62 μm thereof was 100%.

The samples of the bright pigments of Examples 1 to 7, and Comparative Examples 1 to 10 produced above were evaluated by the following method, concerning the circulation property, the coating finish, and the interference color uniformity. Moreover, the method used herein for measuring the particle size distribution and the thickness distribution of the glass flakes also are described below. Table 1 indicates the evaluation results of Examples 1 to 3 and Comparative Examples 1 to 5, Table 2 indicates those of Examples 4 to 5 and Comparative Examples 6 to 9, and Table 3 indicates those of Examples 6 and 7, and Comparative Example 10.

<Measurement Method of Particle Size Distribution>

In the examples, a laser diffraction particle size distribution analyzer (product name: "Microtrac HRA", manufactured by NIKKISO CO., LTD.) was used for measuring the particle size distribution. From the measurement results, the cumulative volume from the smaller particle size to 48 μm and the cumulative volume from the smaller particle size to 62 μm were calculated, and whether or not the particles size at 99% of the cumulative volume (D99) is 48 μm or less, and whether or not the maximum particle size is 62 μm or less were determined.

<Thickness Distribution of Flaky Particles>

In the examples, the thickness d (cf. FIG. 3) was measured with an electronic microscope for arbitrarily sampled 100 flaky particles, so that the thickness distribution was obtained. The frequency of flaky particles having a thickness in the range of 0.8 to 1.9 μm, or the frequency of flaky particles having a thickness in the range of 0.01 to 0.1 μm (or 0.01 to 0.35 μm) was calculated from the thickness distribution.

<Evaluation of Circulation Property>

78 mass % of an acrylic resin (product name: "ACRYDIC A-322", manufactured by DIC Corporation), 16 mass % of a butylated melamine resin (product name: "SUPER BECKAMINE L-117-60", manufactured by DIC Corporation), and 6 mass % of the bright pigment obtained in each of Examples 1 to 5 and Comparative Examples 1 to 4, were mixed with a stirrer, while the viscosity was adjusted to 13 Pa·s (Ford cup No. 4/20° C., manufactured by YASUDA SEIKI SEISAKUSHO, LTD.) by adding an appropriate amount of thinner thereto. Thus, a bright paint was prepared. The clogging of the filter when filtering this bright paint with a triangular filter (made of nylon, with #200 mesh having a mesh size of about 75 μm) was observed by visual inspection. It was evaluated into the following three levels.

3: No clogging was observed
2: Some clogging was observed
1: Noticeable degree of clogging was observed <Production of Coating Samples>

78 mass % of an acrylic resin (product name: "ACRYDIC A-322", manufactured by DIC Corporation), 16 mass % of a butylated melamine resin (product name: "SUPER BECKAMINE L-117-60", manufactured by DIC Corporation), and 6 mass % of the bright pigment obtained in each of Examples 1 to 5 and Comparative Examples 1 to 4, were mixed with a stirrer, while the viscosity was adjusted to 13 Pa·s (Ford cup No. 4/20° C., manufactured by YASUDA SEIKI SEI- SAKUSHO, LTD.) by adding an appropriate amount of thinner thereto. Thus, a bright paint as a metallic base paint was prepared. This bright paint was applied onto a coated plate (D-7, manufactured by Japan Root Service, with the color of intermediate coating=N6.0 using a spray gun (W-100, manufactured by ANEST IWATA Corporation), so that a metallic base layer is formed thereon.

Subsequently, 72 mass % of an acrylic resin (product name: "ACRYDIC A-345", manufactured by DIC Corporation), and 28 mass % of a butylated melamine resin (product name: "SUPER BECKAMINE L-117-60", manufactured by DIC Corporation) were mixed with a stirrer, while the viscosity was adjusted to 24 Pa·s (Ford cup No. 4/20° C., manufactured by YASUDA SEIKI SEISAKUSHO, LTD.) by adding an amount of thinner thereto. Thus, a top clear coating composition was prepared. This top clear coating composition was applied onto the coated plate having the metallic base layer formed thereon using the spray gun (W-100, manufactured by ANEST IWATA Corporation), followed by calcination (at 140° C. for 30 minutes), so that a top clear layer was formed thereon. The thickness of the coating film after the calcination was such that the metallic base layer was 15 μm thick, and the top clear layer was 30 μm thick.

<Evaluation of Coating Finish>

The coating finish was evaluated with a micro-wave-scan (manufactured by BYK-Gardner). The effects on the coating finish caused by the bright pigment were evaluated using a value Wa (0.1 to 0.3 mm).

<Evaluation of Interference Color Uniformity of Coating Film Containing Bright Pigment>

Under D65 natural light source, the interference color uniformity was observed by visual inspection. The degree of the interference color uniformity (mixing degree of interference colors) was evaluated as the following three levels.

3: None of different and various interference colors in particles were observed
2: Some of different and various interference colors in particles were observed
1: A lot of different and various interference colors in particles were observed

TABLE 1

|  | EX. 1 | EX. 2 | EX. 3 | C. EX. 1 | C. EX. 2 | C. EX. 3 | C. EX. 4 | C. EX. 5 |
|---|---|---|---|---|---|---|---|---|
| Average thickness (μm) | 1.3 | 1.0 | 1.5 | 0.7 | 1.3 | 0.7 | 1.3 | 1.3 |
| Refractive index of flaky particles | 1.54 | 1.54 | 1.54 | 1.54 | 1.54 | 1.54 | 1.54 | 1.54 |
| Frequency of flaky particles having a thickness of 0.8 to 1.9 μm (%) | 97 | 91 | 90 | 81 | 97 | 80 | 97 | 96 |
| Average particle size (D50) of flaky particles (μm) | 17.3 | 19.3 | 19.9 | 22.1 | 22.1 | 19.7 | 20.7 | 20.5 |
| Cumulative volume of flaky particles having a particle size of 48 μm or less (%) | 99.4 | 99.1 | 99.1 | 98.2 | 98.5 | 99.2 | 99.0 | 98.8 |
| Cumulative volume of flaky particles having a particle size of 62 μm or less (%) | 100 | 100 | 100 | 99.5 | 99.7 | 100 | 99.8 | 100 |
| Average particle size (D50) of bright pigment (μm) | 17.2 | 19.2 | 19.7 | 22.0 | 21.9 | 19.6 | 20.5 | 20.4 |
| Cumulative volume of bright pigment having a particle size of 48 μm or less (%) | 99.5 | 99.2 | 99.1 | 98.4 | 98.6 | 99.3 | 99.1 | 98.9 |
| Cumulative volume of bright pigment having a particle size of 62 μm or less (%) | 100 | 100 | 100 | 99.7 | 99.8 | 100 | 99.8 | 100 |
| Circulation property | 3 | 3 | 3 | 2 | 1 | 3 | 2 | 2 |
| Coating finish (Wa) | 19 | 17 | 21 | 16 | 26 | 16 | 24 | 23 |
| Interference color uniformity | 3 | 2 | 3 | 1 | 3 | 1 | 3 | 3 |

TABLE 2

|  | EX. 4 | EX. 5 | C. EX. 6 | C. EX. 7 | C. EX. 8 | C. EX. 9 |
|---|---|---|---|---|---|---|
| Average thickness (μm) | 0.05 | 0.07 | 0.27 | 0.3 | 0.07 | 0.07 |
| Refractive index of flaky particles | 1.54 | 1.54 | 1.54 | 1.54 | 1.54 | 1.54 |
| Frequency of flaky particles having a thickness of 0.01 to 0.1 μm (%) | 97 | 91 | 55 | 40 | 90 | 91 |
| Average particle size (D50) of flaky particles (μm) | 17.3 | 18.3 | 18.1 | 19.8 | 20.4 | 20.6 |
| Cumulative volume of flaky particles having a particle size of 48 μm or less (%) | 99.4 | 99.1 | 99.1 | 98.5 | 99.1 | 98.7 |
| Cumulative volume of flaky particles having a particle size of 62 μm or less (%) | 100 | 100 | 100 | 99.9 | 99.7 | 100 |

TABLE 2-continued

|  | EX. 4 | EX. 5 | C. EX. 6 | C. EX. 7 | C. EX. 8 | C. EX. 9 |
|---|---|---|---|---|---|---|
| Average particle size (D50) of bright pigment (μm) | 17.2 | 18.1 | 18.0 | 19.8 | 20.3 | 20.5 |
| Cumulative volume of bright pigment having a particle size of 48 μm or less (%) | 99.5 | 99.2 | 99.1 | 98.6 | 99.1 | 98.8 |
| Cumulative volume of bright pigment having a particle size of 62 μm or less (%) | 100 | 100 | 100 | 99.9 | 99.7 | 100 |
| Circulation property | 3 | 3 | 3 | 2 | 2 | 2 |
| Coating finish (Wa) | 7 | 7 | 7 | 14 | 8 | 8 |
| Interference color uniformity | 3 | 3 | 1 | 1 | 3 | 3 |

TABLE 3

|  | EX. 6 | EX. 7 | C. EX. 10 |
|---|---|---|---|
| Average thickness (μm) | 0.2 | 0.24 | 0.27 |
| Refractive index of flaky particles | 1.54 | 1.54 | 1.54 |
| Frequency of flaky particles having a thickness of 0.01 to 0.35 μm (%) | 92 | 90 | 85 |
| Average particle size (D50) of flaky particles (μm) | 17.9 | 18.3 | 18.1 |
| Cumulative volume of flaky particles having a particle size of 48 μm or less (%) | 99.4 | 99.1 | 99.1 |
| Cumulative volume of flaky particles having a particle size of 62 μm or less (%) | 100 | 100 | 100 |
| Average particle size (D50) of bright pigment (μm) | 17.8 | 18.1 | 18.0 |
| Cumulative volume of bright pigment having a particle size of 48 μm or less (%) | 99.5 | 99.2 | 99.2 |
| Cumulative volume of bright pigment having a particle size of 62 μm or less (%) | 100 | 100 | 100 |
| Circulation property | 3 | 3 | 3 |
| Coating finish (Wa) | 7 | 7 | 7 |
| Interference color uniformity | 3 | 2 | 1 |

As seen from the above results, each bright pigment of Examples 1 to 3 allowed uniform color development in which no mixture of various colors appeared in particles, as well as a favorable circulation property and coating finish to be achieved. Such a bright pigment contained the flaky particles in which the particle size at 99% of the cumulative volume from the smaller particle size was 48 μm or less, the maximum particle size was 62 μm or less, and the frequency of flaky particles having a thickness in the range of 0.8 μm to 1.9 μm was 90% or more by volume. Although some interference colors were observed in Example 2, there was no problem in use. In contrast, each bright pigment of Comparative Examples 1 to 5 was not able to satisfy uniform color development in which no mixture of various colors appeared in particles, and a favorable circulation property and coating finish simultaneously. Further, it turned out that the particle size at 50% of the cumulative volume from the smaller particle size was more preferably less than 20 μm.

In addition, each bright pigment of Examples 4 and 5 allowed uniform color development in which no mixture of various colors appeared in particles, as well as a favorable circulation property and coating finish to be achieved. Such a bright pigment contained the flaky particles in which the particle size at 99% of the cumulative volume from the smaller particle size was 48 μm or less, the maximum particle size was 62 μm or less, and the frequency of flaky particles having a thickness in the range of 0.01 μm to 0.1 μm was 90% or more by volume. In contrast, each bright pigment of Comparative Examples 6 to 9 was not able to satisfy uniform color development in which no mixture of various colors appeared in particles, and a favorable circulation property and coating finish simultaneously. It turned out that the particle size at 50% of the cumulative volume from the smaller particle size was more preferably less than 20 μm.

Further, as seen from Examples 1 and 3, and Comparative Examples 2, 4 and 5 in Table 1, it turned out that an improved coating finish was achieved as long as the particle size at 99% of the cumulative volume from the smaller particle size was 48 μm or less and the maximum particle size was 62 μm or less, even if the flaky particles had a large average thickness, such as 1.3 μm or more (as exemplified by Examples 1 and 3).

It can be seen from Examples 6 and 7, and Comparative Example 10 in Table 3 that an improved interference color uniformity was achieved if the flaky particles had a thickness distribution in which the frequency of the flaky particles having a thickness in the range of 0.01 to 0.35 μm was 90% or more by volume.

INDUSTRIAL APPLICABILITY

The bright pigment of the present invention can achieve uniform color development in which no mixture of various colors appears in particles, as well as a favorable circulation property and coating finish simultaneously, and thus is useful for various applications, such as automotive body coatings.

The invention claimed is:
1. A bright pigment comprising:
flaky particles; and
a metal oxide layer coating at least a part of a surface of each flaky particle, wherein:
   the flaky particles have a particle size distribution in which a particle size at 99% of a cumulative volume from a smaller particle size is 48 μm or less, and a maximum particle size is 62 μm or less;
   the flaky particles are made of a material having a refractive index in a range of 1.4 to 1.8; and
   the flaky particles have a thickness distribution in which a frequency of the particles having a thickness in a range of 0.8 μm to 1.9 μm is 90% or more by volume, or a frequency of the particles having a thickness in a range of 0.01 μm to 0.35 μm is 90% or more by volume.

2. A bright pigment comprising:
flaky particles; and
a metal oxide layer coating at least a part of a surface of each flaky particle, wherein:
the flaky particles are made of a material having a refractive index in a range of 1.4 to 1.8;
the flaky particles have a thickness distribution in which a frequency of the particles having a thickness in a range of 0.8 μm to 1.9 μm is 90% or more by volume, or a frequency of the particles having a thickness in a range of 0.01 μm to 0.35 μm is 90% or more by volume; and
the bright pigment has a particle size distribution in which a particle size at 99% of a cumulative volume from a smaller particle size is 48 μm or less, and a maximum particle size is 62 μm or less.

3. The bright pigment according to claim 1, wherein the flaky particles have a particle size distribution in which a particle size at 50% of the cumulative volume from the smaller particle size is less than 20 μm.

4. The bright pigment according to claim 2, wherein the bright pigment has a particle size distribution in which a particle size at 50% of the cumulative volume from the smaller particle size is less than 20 μm.

5. The bright pigment according to claim 1, wherein the flaky particles are made of at least one material selected from glass, silica, alumina, synthetic mica and mica.

6. The bright pigment according to claim 1, wherein the metal oxide layer is formed with at least one oxide selected from the group consisting of titanium dioxide and iron oxide.

7. A bright coating composition containing the bright pigment according to claim 1.

8. An automotive body coating comprising a metallic base layer containing 0.01 to 30 mass % of the bright pigment according to claim 1.

9. The bright pigment according to claim 2, wherein the flaky particles are made of at least one material selected from glass, silica, alumina, synthetic mica and mica.

10. The bright pigment according to claim 2, wherein the metal oxide layer is formed with at least one oxide selected from the group consisting of titanium dioxide and iron oxide.

11. A bright coating composition containing the bright pigment according to claim 2.

12. An automotive body coating comprising a metallic base layer containing 0.01 to 30 mass % of the bright pigment according to claim 2.

* * * * *

UNITED STATES PATENT AND TRADEMARK OFFICE
CERTIFICATE OF CORRECTION

PATENT NO. : 8,440,014 B2
APPLICATION NO. : 12/597829
DATED : May 14, 2013
INVENTOR(S) : Kitamura et al.

It is certified that error appears in the above-identified patent and that said Letters Patent is hereby corrected as shown below:

In the Specification

Column 6, line 54: delete "(1150)" and insert --(D50)--.

Column 14, lines 38-44: delete "When the resin.....active hydrogen." and insert the same on line 37 after "can be used." as a continuation of the paragraph.

Column 16, line 19: delete "this" and insert --these--.

Signed and Sealed this
Fifteenth Day of October, 2013

Teresa Stanek Rea
*Deputy Director of the United States Patent and Trademark Office*